United States Patent
Xu

(10) Patent No.: US 8,050,398 B1
(45) Date of Patent: Nov. 1, 2011

(54) ADAPTIVE CONFERENCING POD SIDETONE COMPENSATOR CONNECTING TO A TELEPHONIC DEVICE HAVING INTERMITTENT SIDETONE

(75) Inventor: Xin Xu, Ottawa (CA)

(73) Assignee: Clearone Communications, Inc., Salt Lake City, UT (US)

( * ) Notice: Subject to any disclaimer, the term of this patent is extended or adjusted under 35 U.S.C. 154(b) by 1035 days.

(21) Appl. No.: 11/933,388

(22) Filed: Oct. 31, 2007

(51) Int. Cl.
*H04M 9/00* (2006.01)
(52) U.S. Cl. .................................. 379/392; 379/392.01
(58) Field of Classification Search .............. 379/3, 391, 379/392, 392.01, 406.01–406.16; 370/286–292; 455/570
See application file for complete search history.

(56) References Cited

U.S. PATENT DOCUMENTS

| | | | |
|---|---|---|---|
| 4,591,670 A | 5/1986 | Itoh | |
| 4,609,787 A | 9/1986 | Horna | |
| 4,670,903 A | 6/1987 | Araseko et al. | |
| 4,827,472 A | 5/1989 | Ferrieu | |
| 4,894,820 A | 1/1990 | Miyamoto et al. | |
| 4,956,838 A | 9/1990 | Gilloire et al. | |
| 5,136,577 A | 8/1992 | Amano et al. | |
| 5,263,079 A | 11/1993 | Umemoto | |
| 5,272,695 A | 12/1993 | Makino et al. | |
| 5,278,900 A | 1/1994 | Van Gerwen et al. | |
| 5,283,784 A | 2/1994 | Genter | |
| 5,305,307 A | 4/1994 | Chu | |
| 5,307,405 A | 4/1994 | Sih | |
| 5,371,789 A | 12/1994 | Hirano | |
| 5,416,829 A | 5/1995 | Umemoto | |
| 5,463,618 A | 10/1995 | Furukawa et al. | |
| 5,559,881 A | 9/1996 | Sih | |
| 5,610,909 A | 3/1997 | Shaw | |
| 5,631,900 A | 5/1997 | McCaslin et al. | |
| 5,633,936 A | 5/1997 | Oh | |
| 5,636,272 A | 6/1997 | Rasmusson | |
| 5,646,991 A | 7/1997 | Sih | |
| 5,661,813 A | 8/1997 | Shimauchi et al. | |
| 5,663,955 A * | 9/1997 | Iyengar | 370/291 |
| 5,668,794 A | 9/1997 | McCaslin et al. | |
| 5,687,229 A | 11/1997 | Sih | |
| 5,732,134 A * | 3/1998 | Sih | 379/406.13 |
| 5,737,410 A | 4/1998 | Vahatalo et al. | |
| 5,818,945 A | 10/1998 | Makino et al. | |
| 5,859,914 A | 1/1999 | Onon et al. | |
| 5,920,834 A | 7/1999 | Sih et al. | |
| 5,933,494 A | 8/1999 | Yang et al. | |
| 5,933,495 A | 8/1999 | Oh | |
| 5,937,009 A | 8/1999 | Wong et al. | |

(Continued)

*Primary Examiner* — MD S Elahee
*Assistant Examiner* — Akelaw Teshale
(74) *Attorney, Agent, or Firm* — Matthew J. Booth & Associates, PLLC; Matthew J. Booth

(57) ABSTRACT

Disclosed herein are teleconferencing pods that include a microphone and a loudspeaker for open-air conversations, connectible to a separate telephonic device that generates an intermittent sidetone that is active at certain times not in the control or monitoring of the pod. In those pods is a sidetone suppressor that suppresses a distracting open-air echo produced from the intermittent sidetone and a compensator that detects sidetone transitions to avoid generating an echo signal in the pod and to avoid adapting suppression in the absence of an externally-generated sidetone. Sidetone suppression may be by several means, and may include variables controlled by adaption, including delay factors, scalers and coefficients. Detailed information on various example embodiments of the inventions are provided in the Detailed Description below, and the inventions are defined by the appended claims.

18 Claims, 12 Drawing Sheets

U.S. PATENT DOCUMENTS

| | | | |
|---|---|---|---|
| 5,937,060 | A | 8/1999 | Oh |
| 6,001,131 | A | 12/1999 | Raman |
| 6,052,462 | A | 4/2000 | Lu |
| 6,125,179 | A | 9/2000 | Wu |
| 6,147,979 | A | 11/2000 | Michel et al. |
| 6,148,078 | A | 11/2000 | Romesburg |
| 6,151,397 | A | 11/2000 | Jackson, Jr. II et al. |
| 6,160,886 | A | 12/2000 | Romesburg et al. |
| 6,163,608 | A | 12/2000 | Romesburg et al. |
| 6,212,273 | B1 | 4/2001 | Hemkumar et al. |
| 6,246,760 | B1 | 6/2001 | Makino et al. |
| 6,263,078 | B1 | 7/2001 | McLaughlin et al. |
| 6,278,785 | B1 | 8/2001 | Thomasson |
| 6,381,224 | B1 | 4/2002 | Lane et al. |
| 6,385,176 | B1 | 5/2002 | Iyengar et al. |
| 6,434,110 | B1 | 8/2002 | Hemkumar |
| 6,466,666 | B1 | 10/2002 | Erikisson |
| 6,496,581 | B1 | 12/2002 | Finn et al. |
| 6,507,653 | B1 | 1/2003 | Romesburg |
| 6,516,062 | B1 | 2/2003 | Yang et al. |
| 6,542,611 | B1 | 4/2003 | Lane et al. |
| 6,556,682 | B1 | 4/2003 | Gilloire et al. |
| 6,563,803 | B1 | 5/2003 | Lee |
| 6,597,787 | B1 | 7/2003 | Lindgren et al. |
| 6,694,018 | B1 | 2/2004 | Omori |
| 6,704,415 | B1 | 3/2004 | Katayama et al. |
| 6,718,036 | B1 | 4/2004 | Van Schyndel et al. |
| 6,724,736 | B1 | 4/2004 | Azriel |
| 6,766,019 | B1 * | 7/2004 | Benesty et al. .......... 379/406.01 |
| 6,768,796 | B2 | 7/2004 | Lu |
| 6,792,107 | B2 | 9/2004 | Tucker et al. |
| 6,836,547 | B2 | 12/2004 | Tahernezhaadi |
| 6,859,531 | B1 | 2/2005 | Deisher |
| 6,868,157 | B1 | 3/2005 | Okuda |
| 6,922,403 | B1 * | 7/2005 | Yoo ................................ 370/286 |
| 6,928,161 | B1 | 8/2005 | Graumann |
| 6,931,123 | B1 | 8/2005 | Hughes |
| 6,944,289 | B2 | 9/2005 | Tahernezhaadi et al. |
| 6,947,549 | B2 | 9/2005 | Yiu et al. |
| 6,950,513 | B2 | 9/2005 | Hirai et al. |
| 6,961,422 | B2 | 11/2005 | Boland |
| 6,961,423 | B2 | 11/2005 | Pessoa et al. |
| 6,963,648 | B2 | 11/2005 | Wilder |
| 7,003,096 | B2 | 2/2006 | Lashley et al. |
| 7,016,488 | B2 | 3/2006 | He et al. |
| 7,031,269 | B2 | 4/2006 | Lee |
| 7,035,397 | B2 * | 4/2006 | Diethorn .................. 379/406.01 |
| 7,046,794 | B2 | 5/2006 | Piket et al. |
| 7,117,145 | B1 | 10/2006 | Venkatesh et al. |
| 7,155,018 | B1 | 12/2006 | Stokes, III et al. |
| 7,171,003 | B1 | 1/2007 | Venkatesh et al. |
| 7,177,416 | B1 | 2/2007 | Zhang et al. |
| 7,203,308 | B2 | 4/2007 | Kubota |
| 7,212,628 | B2 | 5/2007 | Popovic et al. |
| 7,215,765 | B2 | 5/2007 | Dyba et al. |
| 7,231,036 | B2 | 6/2007 | Akie |
| 7,333,605 | B1 * | 2/2008 | Zhang et al. ............. 379/406.08 |
| 7,742,592 | B2 * | 6/2010 | Faller ....................... 379/406.01 |
| 2002/0041678 | A1 | 4/2002 | Basburg-Ertem et al. |
| 2002/0054685 | A1 | 5/2002 | Avendano et al. |
| 2003/0007633 | A1 | 1/2003 | Tucker et al. |
| 2003/0053617 | A1 | 3/2003 | Diethorn |
| 2003/0123674 | A1 | 7/2003 | Boland |
| 2003/0133565 | A1 | 7/2003 | Chang et al. |
| 2003/0174661 | A1 | 9/2003 | Lee |
| 2003/0185402 | A1 | 10/2003 | Benesty et al. |
| 2003/0219113 | A1 | 11/2003 | Bershad et al. |
| 2003/0235244 | A1 | 12/2003 | Pessoa et al. |
| 2003/0235294 | A1 | 12/2003 | Dyba et al. |
| 2003/0235295 | A1 | 12/2003 | He et al. |
| 2003/0235312 | A1 | 12/2003 | Pessoa et al. |
| 2004/0001450 | A1 | 1/2004 | He et al. |
| 2004/0062386 | A1 | 4/2004 | Tahernezhaadi et al. |
| 2004/0071284 | A1 | 4/2004 | Abutalebi et al. |
| 2004/0161101 | A1 | 8/2004 | Yiu et al. |
| 2004/0170271 | A1 | 9/2004 | Kubota |
| 2004/0208312 | A1 | 10/2004 | Okuda |
| 2004/0228474 | A1 | 11/2004 | Taniguchi et al. |
| 2004/0247111 | A1 | 12/2004 | Popovic et al. |
| 2005/0123129 | A1 | 6/2005 | Awad et al. |
| 2005/0129225 | A1 | 6/2005 | Piket et al. |
| 2005/0207566 | A1 | 9/2005 | Ohki et al. |
| 2005/0286697 | A1 | 12/2005 | Bathurst et al. |
| 2005/0286714 | A1 | 12/2005 | Tokuda |
| 2006/0013383 | A1 | 1/2006 | Barron et al. |
| 2006/0013412 | A1 | 1/2006 | Goldin |
| 2006/0018457 | A1 | 1/2006 | Unno et al. |
| 2006/0018458 | A1 | 1/2006 | McCree et al. |
| 2006/0018459 | A1 | 1/2006 | McCree |
| 2006/0018460 | A1 | 1/2006 | McCree |
| 2006/0034448 | A1 | 2/2006 | Parry |
| 2006/0067519 | A1 | 3/2006 | Stenger |
| 2006/0069556 | A1 | 3/2006 | Nadjar et al. |
| 2006/0140392 | A1 | 6/2006 | Ahmadi |
| 2006/0147029 | A1 | 7/2006 | Stokes, III et al. |
| 2006/0198329 | A1 | 9/2006 | Fang et al. |
| 2006/0198511 | A1 | 9/2006 | Su et al. |
| 2006/0222172 | A1 | 10/2006 | Chhetri et al. |
| 2006/0233353 | A1 * | 10/2006 | Beaucoup et al. ........ 379/406.01 |
| 2007/0019803 | A1 | 1/2007 | Merks et al. |
| 2007/0021958 | A1 | 1/2007 | Visser et al. |
| 2007/0038442 | A1 | 2/2007 | Visser et al. |
| 2007/0047738 | A1 | 3/2007 | Ballantyne et al. |
| 2007/0058798 | A1 | 3/2007 | Takada |
| 2007/0058799 | A1 | 3/2007 | Sudo |
| 2007/0071254 | A1 | 3/2007 | Marton |
| 2007/0092074 | A1 | 4/2007 | Takada |
| 2007/0121925 | A1 | 5/2007 | Cruz-Zeno et al. |
| 2007/0133442 | A1 | 6/2007 | Masuda et al. |
| 2007/0140059 | A1 | 6/2007 | Guion et al. |
| 2007/0189508 | A1 | 8/2007 | Knutson et al. |
| 2007/0189547 | A1 | 8/2007 | Hsu et al. |

* cited by examiner

ADAPTIVE CONFERENCING POD SIDETONE COMPENSATOR CONNECTING TO A TELEPHONIC DEVICE HAVING INTERMITTENT SIDETONE

BACKGROUND

The claimed systems and methods relate generally to loudspeaker teleconferencing systems that utilize full duplex operation with distant participants, and more particularly to teleconferencing pods that can connect to a telephone device generating an intermittent sidetone that is active at certain times not in the control or monitoring of the pod, wherein the pod includes a sidetone suppressor and compensation function to avoid applying suppression in the absence of an externally-generated sidetone.

The inventions described herein relate to conferencing systems that can connect to a telephonic device in systems such as that depicted in FIG. 1. In that system 100, a telephonic connection is made between a local participant in proximity to a conferencing pod 102 and a distant party 108 using distant party equipment and/or devices, not shown. In system 100, a telephonic device 104 is used to make a connection 107 with distant party 108. Herein the term telephonic and telephone refer not only to devices and systems that utilize a public switched telephone network (PSTN), but also other devices that can make an audio connection between a local participant and a distant participant through any kind of network or connection including point-to-point, wired, wireless, switched packet and any other. The telephonic device 104 includes a keypad and/or controls 106 for controlling the connection 107 to distant party 108 and optionally other controls such as volume, mute and others. Conferencing pod 102 may connect to device 104 by simulating another device type such as a headset. Hereinafter the term "connector" includes not only physical connections, but also terminals and contacts of any type, and also digital, network, wireless or virtual connections.

Telephonic device 104 may produce a sidetone. The term sidetone has several historical meanings, and originates from the early days of radio when Morse code was used. To provide feedback to the radio equipment operator and audible tone was produced in a headset worn by the operator at times when the transmit key was depressed. In devices using an audio signal the term sidetone has come to mean a retransmission of an audio signal received at a local microphone to a local participant, for example through a headset. This is done as feedback to the local participant that his words are being transmitted. Sidetone generation and use can be understood in reference to FIG. 2A, wherein a simple telephonic device is illustrated. The device of FIG. 2A is a stand-alone telephonic device, with an incoming port 208 and an outgoing port 206 for carrying audio to and from a distant participant. This device also includes a speaker 202 and a microphone 200. Speaker 202 and microphone 200 would ordinarily be made part of a headset or other equipment whereby speaker 202 is positioned near the ear of local participant 204, and the sound of 213 produced by speaker 202 is not substantially carried to microphone 200.

Where sound produced by the Speaker 202 is not being carried to microphone 200 it may be desirable to include a sidetone generator 210. The sidetone generator produces an audio signal received at the microphone 200 at a low level, typically less than what listener 204 hears a distant participant, providing feedback to the listener 204 that his speech is being transmitted to the distant parties. That audio signal is fed to a mixer 212 along with the distant audio received at port 208 producing a signal at speaker 202 that includes both the distant audio and a sidetone.

Now referring to FIG. 2B, the functional aspects of a system as shown in FIG. 1 are illustrated. The system of FIG. 2B includes a telephone device having many of the same components as that of the stand-alone device, including an incoming port 208, an outgoing port 206, a sidetone generator 210 and the mixer 212. Although this telephone device might include a speaker and microphone, here a connection is made to a separate device through an incoming connector 216 and an outgoing connector 214 which supplies an incoming and outgoing audio signal to an external device, for example a headset. The external device connects to connectors 214 and 216, and includes its own speaker 203 and microphone 201. If the external device is a conferencing pod, speaker 203 will be configured to produce sound in the local vicinity so that the local participants 204 can hear the distant audio received at port 208. Microphone 201 is likewise configured to pick up sound in the local vicinity of the pond such that the local participants can be heard by the distant parties.

The presence of sidetone generator 210 introduces a problem. The inclusion of sidetone generator 210 in the telephonic equipment may be on an assumption that external equipment connected to ports 214 and 216 is a headset, or rather that a substantial transmission path does not exist between the speaker and microphone at the external device. However, the presence of a conferencing pod does indeed introduce such a path 222. Thus, distant audio produced at Speaker 203 is carried to microphone 201 and transmitted over path 222 through the outgoing connector 260 distant participants. This is perceived by the distant participants as an echo with the delay approximately two times the propagation delay between the local and the distant participants. Additionally, because of the presence of a sidetone generator 210 a feedback loop is introduced in the local equipment. This is experienced by the local participants and the distant participants as ringing and, if the coupling between speaker 203 and microphone 201 is sufficient, howling.

Therefore, the situation presented in FIG. 2B illustrates a particular problem where a conferencing pod is to be connected to a telephone in substitution of a headset, although that is not the only situation that the inventions which are described herein may be applied to. However, the situation provides a convenient illustration to describe the configuration and operations described in the discussion below.

BRIEF SUMMARY

Disclosed herein are teleconferencing pods that include a microphone and a loudspeaker for open-air conversations, connectible to a separate telephonic device that generates an intermittent sidetone that is active at certain times not in the control or monitoring of the pod. In those pods is a sidetone suppressor that suppresses a distracting open-air echo produced from the intermittent sidetone and a compensator that detects sidetone transitions to avoid generating an echo signal in the pod and to avoid adapting suppression in the absence of an externally-generated sidetone. Sidetone suppression may be by several means, and may include variables controlled by adaption, including delay factors, scalers and coefficients. Detailed information on various example embodiments of the inventions are provided in the Detailed Description below, and the inventions are defined by the appended claims.

Figure 1:
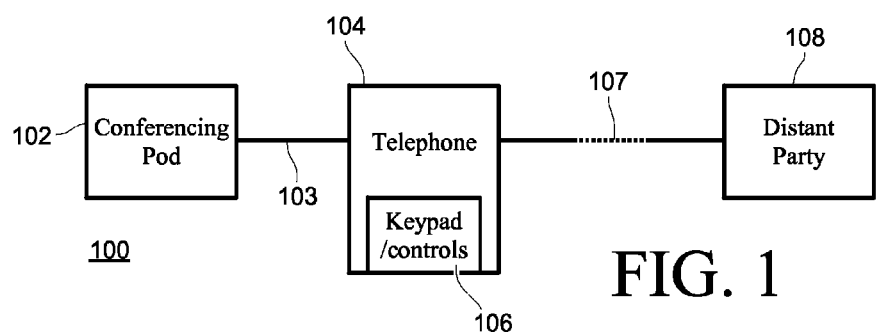
FIG. 1 shows the conceptual elements of a conferencing system utilizing a conferencing pod that connects to a generic piece of telephonic equipment.

Reference will now be made in detail to particular implementations of the various inventions described herein in their various aspects, examples of which are illustrated in the accompanying drawings and in the detailed description below.

DETAILED DESCRIPTION

Described herein are certain teleconferencing products for communicating between a local and one or more distant or far-end participants. Those products will typically include an enclosure, one or more microphones for picking up local sound or speech and one or more speakers for generating audio from an audio signal received from the one or more distant conferees. The speakers will be driven by or may be included in a sound producing circuit, for example a power amplifier, and the microphones by a microphone circuit, for example a preamplifier. These devices will include a full-duplex port, which is a transmitter and receiver channel in one bundle, however a full-duplex port can be fashioned from a separate transmitter and receiver channels. The teleconferencing products may or may not utilize frequency decomposition, which is the application of audio data processing in sub-bands. These products need not utilize frequency decomposition, but may rather process wide-band audio data if desired.

It is to be understood that certain substitutions and modifications may be made to the products described herein without departing from the disclosed and/or claimed inventions. For example, in today's signal processing equipment an audio signal may be represented as a stream of audio data, and these are synonymous herein to their respective analog and digital domains. Likewise, where an implementation is described as hardware, it can just as easily be made with software, and vice versa. Exemplary products are presented with certain features, which may contain particular implementations of the inventions described and claimed herein. Where a claimed invention is described with reference to any particular implementation, it is to be understood that this is merely for convenience of description and the inventions so described are not limited to the implementations contained herein.

Some conferencing products may include more than one communication port for communicating participants in more than one location. Others of the products may be connected to an audio signal source at the same time as a connection with a distant participant. A conferencing system utilizing echo cancellation may feed the audio between two distant participants to each other, otherwise they might not hear each other. Certain of conferencing products might be configured or switched such that the audio from one participant is not transmitted to another, thereby permitting a partial private audio line from a distant participant to the local participants. By replacing a connection to a conferee with a connection to an audio source, which could be any source of audio including a playback device or a broadcast receiver, a local participant may listen to that audio source while not transmitting that audio to distant participants. The configuration may be by a physical, logical or a software switch, which can be implemented as a checkbox or other graphical control element. This effect may be one way, meaning that one party is private, or multi-way if it is desired to keep the speech of more than one party private from the others. The effect may be controllable, even during a conference, if it is desired to have a partially private conference for part of the time.

Figure 2A:
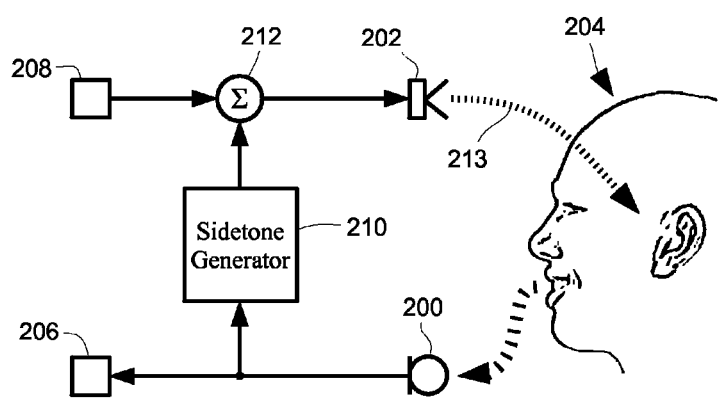
FIG. 2A illustrates the concept of a sidetone in telephony.
Figure 2B:
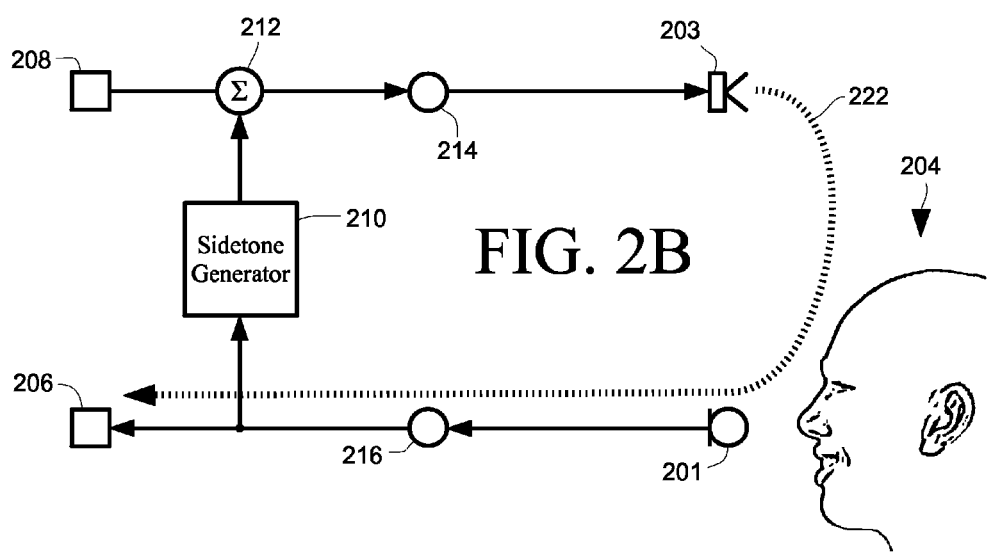
FIG. 2B illustrates the traversal of a sidetone through a conferencing system utilizing a conferencing pod.
Figure 2C:
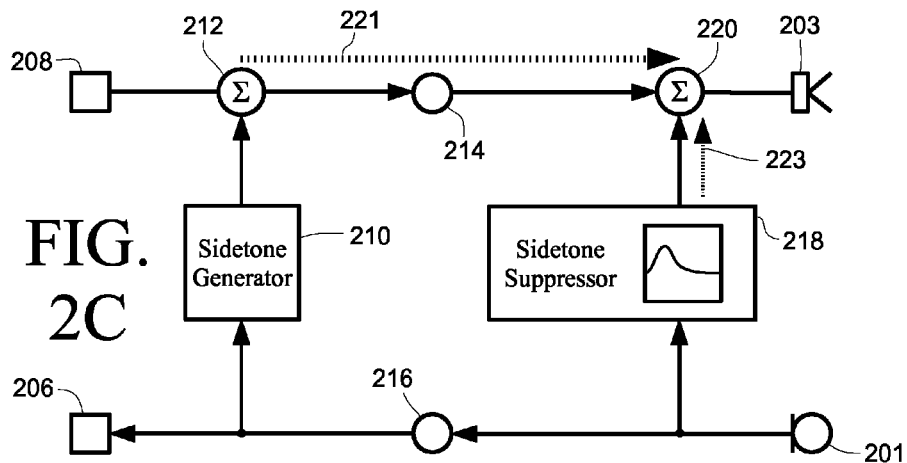
FIG. 2C illustrates the interaction of a sidetone suppressor in a conferencing system utilizing a conferencing pod connected to a telephonic device including a constant-sidetone generator.

Now continuing the discussion above and referring to FIG. 2C, a conferencing pod may provide suppression for the sidetone 221 produced by generator 210. This may be accomplished by a sidetone suppressor 218 and a mixer 220. Sidetone suppressor 218 predicts the sidetone that will be generated by generator 210 and produced at Speaker 203. The inverse 223 of this predicted sidetone signal is injected to mixer 220, thereby reducing the sidetone produced at speaker 203 to a level that is not perceptible, or at least is not distracting and/or a nuisance. Sidetone suppressor 218 may receive the signal of microphone 201, or might be input with a different signal that includes the signal received at microphone 201, for example where several microphones are present. Sidetone suppressor 218 may include coefficients, for example through an adaptive filter, that characterize and profile the sidetone generated by generator 210 as compared to the signal received at microphone 201. Alternatively, another method of predicting a generated sidetone may be used.

A system described by FIG. 2C will work to suppress a sidetone at speaker 203 so long as the configuration remains stable. However, it may be that a sidetone generator 210 is not always present. For example, a piece of telephonic equipment may disable the generation of a sidetone at times when the local participant audio is not being transmitted to a distant participant. This may occur for example if the telephonic equipment includes a mute button, or also might occur at a time when a connection is not present to a distant participant or even when the telephonic equipment is powered off.

Figure 2D:
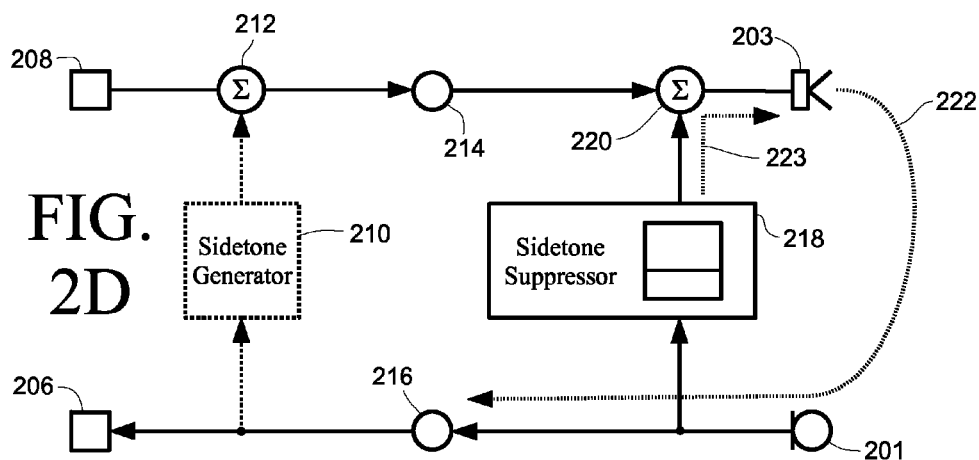
FIG. 2D illustrates an error condition in the system of FIG. 2C after removal of an external sidetone generator.

Such an event produces the state depicted in FIG. 2D, were effectively a sidetone generator 210 is not present. In that state a sidetone 221 does not arrive at mixer 220, and suppression signal 223 arrives at speaker 203. Because the suppression signal is similar to the sidetone in the inverse, a local participant will hear an effective sidetone even without generator 210. Sidetone suppressor may be adaptive, in which case this pseudo-sidetone will be evident until adaption occurs. Additionally, if the sidetone suppressor is adaptive, it adapts to the absent sidetone generator, and thus if that generator is later reintroduced sidetone will be heard, which may lead to ringing, feedback or other disturbances.

In the ideal case a telephonic device would recognize the device which is connected to it, enabling a sidetone generator when a headset is attached and disabling the generator when a conferencing pod is attached. In the alternative, a conferencing pod could receive a signal from the intermittent sidetone-generating device and the pod could apply sidetone suppression at appropriate times. However, in today's devices no such signals are known; rather the designs of many telephones simply require that a headset and not a conferencing pod be connected. Described herein is a method of detecting a sidetone transition from on to off and, by way of sidetone amplitude detection, from off to on, thereby providing a virtual missing signal of sidetone generation presence to a pod allowing for appropriate sidetone suppression.

Exemplary Conferencing Pods

Figure 3:
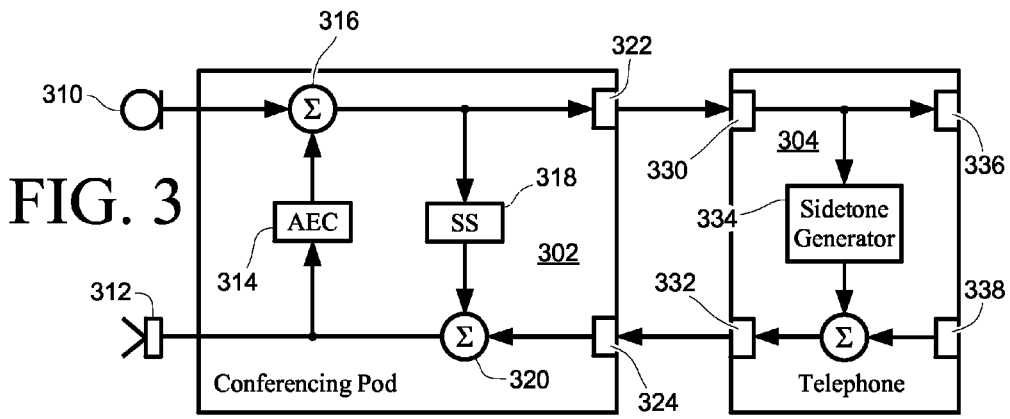
FIG. 3 conceptually illustrates certain elements of a conferencing pod system that includes an acoustic echo canceller, a sidetone generator and a sidetone suppressor.

Two exemplary conferencing pods are now described which may implement intermittent sidetone detection, which take the general architecture shown in FIG. 3. In that architecture and functionality of a conferencing device is divided between a conferencing pod 302 and a telephonic device 304 which in this case is a standard telephone. Telephone 304 may include a sidetone generator 334 in some configurations, although that is not necessary. Sidetone generator 334 may provide for intermittent operation. A telephonic device 304 includes an outgoing ports 336 and an incoming port 338, which in this example are included in a single RJ-11 connector standard to public telephone systems. A telephonic device 304 may include means for transmitting sound to a local participant using a speaker or earpiece, and may also include a microphone. A telephonic device 304 further includes a local audio input port 330 in a distant audio output port 332 for a connection with an external set device that includes a speaker and a microphone. Ports 330 and 332 may be embodied as separate connectors were in a single connector, such as a 3.5 mm (⅛ inch) mini plug commonly used for headsets that connect to ordinary telephones. As will be seen below, any kind of connector may be used to provide port 330 and 332, and no particular one is required.

A conferencing pod 302 is provided having a microphone 310 in the speaker 312 transmitting sound to local participants in local vicinity of the conferencing pod. The connection is made to telephonic device 304 by way of an outgoing port 322 and an incoming port 324. In the exemplary conferencing pod 302 and acoustic echo canceler 314 is provided, although it is not required. Acoustic echo canceler 314 applies and echo cancellation signal to the outgoing audio stream by way of mixer 316. Conferencing pod 302 also includes a sidetone suppressor 318 injecting a suppression signal into mixer 320. In this example the sidetone suppressor receives as input signal being delivered to the telephonic device 304 through the output port 322 after any processing performed on the signal received a microphone 310, although a different system might be constructed using an input located elsewhere.

Conferencing pod 302 may include other features and components in many different configurations. For example, microphone 310 may be substituted with a microphone array in a configuration to provide omnidirectivity or noise cancellation. Speaker 312 could be substituted with an array as well. Conferencing pod 302 might be fashioned in any form factors and with controls, displays and other user interactive features. Microphone 310 and speaker 312 could also be substituted for a headset worn on the head or a handset held in the hand.

Figure 4A:
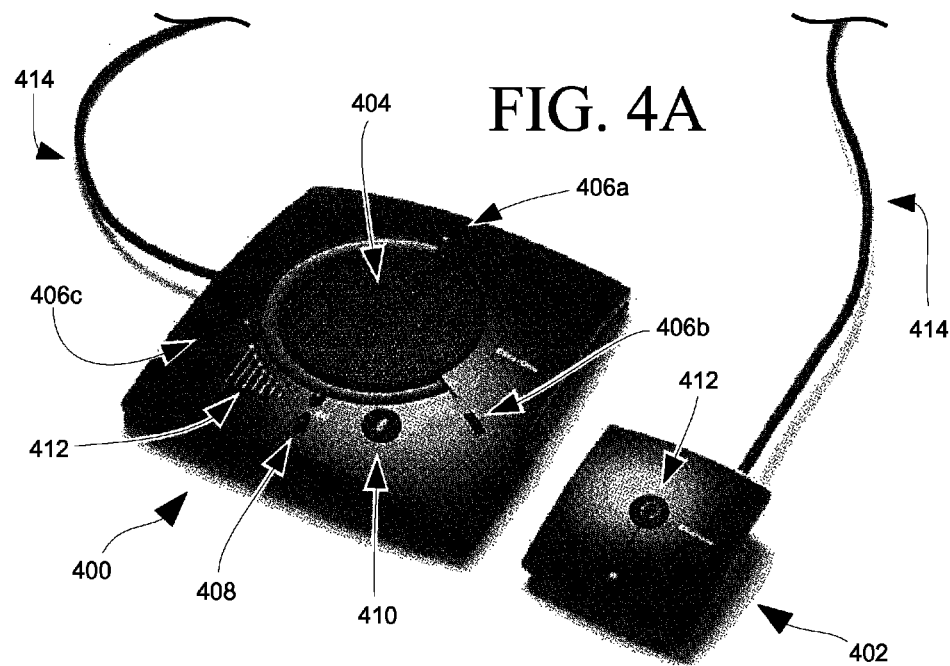
FIG. 4A depicts a first exemplary conferencing pod having a breakout box for connecting to an external telephonic device.

A first exemplary conferencing pod 400 is shown in FIG. 4A in a first configuration together with a telephone breakout box 402. Located to the pod are a central speaker 404 and three microphones 406a, 406b and 406c. Also in this example are lighted indicators on the microphones that indicate when the pod is un-muted. Volume up/down controls 408 are provided to control the volume of sound produced that speaker 404. Indicator lights 412 show the volume state as controlled by controls 408. A mute button 410 toggles the mute function of the pod.

Figure 4B:
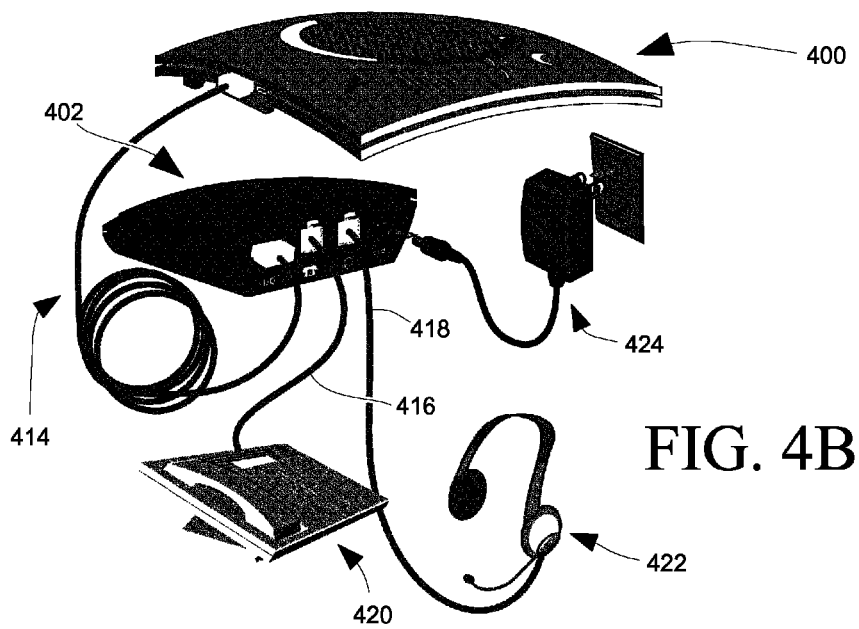
FIG. 4B depicts the conferencing pod of FIG. 4A wherein the breakout box is configured to connect to a headset connection of an external telephonic device.

A telephone breakout box 402 connects to pod 400 through a cable 414. Telephone breakout box 402 toggles between pod 400 and a headset connected to box 402, as will shortly be discussed. A headset toggle button 412 performs this toggling function. Now referring to FIG. 4B, it can be seen that telephone breakout box 402 includes several socket connectors at the rear, which are as follows. A connector is provided for data cable 414, again connecting pod 400 to box 402. Another connector is adapted to receive a telephone cable 416 which connects to a telephone device 420 in its headset jack, in this example through an RJ-9 connector although in other examples with other connector types. Another connector is provided for a headset cable 418 leading to a headset 422, which may use the same or a different connector type as cable 416. A power connector receives power from a power supply 424, which in this configuration also supplies power through cable 414 to pod 400.

Using this first configuration, pod 400 may connect to an ordinary telephone 420 with a headset connection, thereby adapting telephone 420 into a conference phone. By pressing headset toggle button 412 a user can switch between conference mode and headset mode, thus preserving the headset function of the telephone 420. The reader will recognize that the concepts presented so far are applicable to this configuration.

Figure 4C:
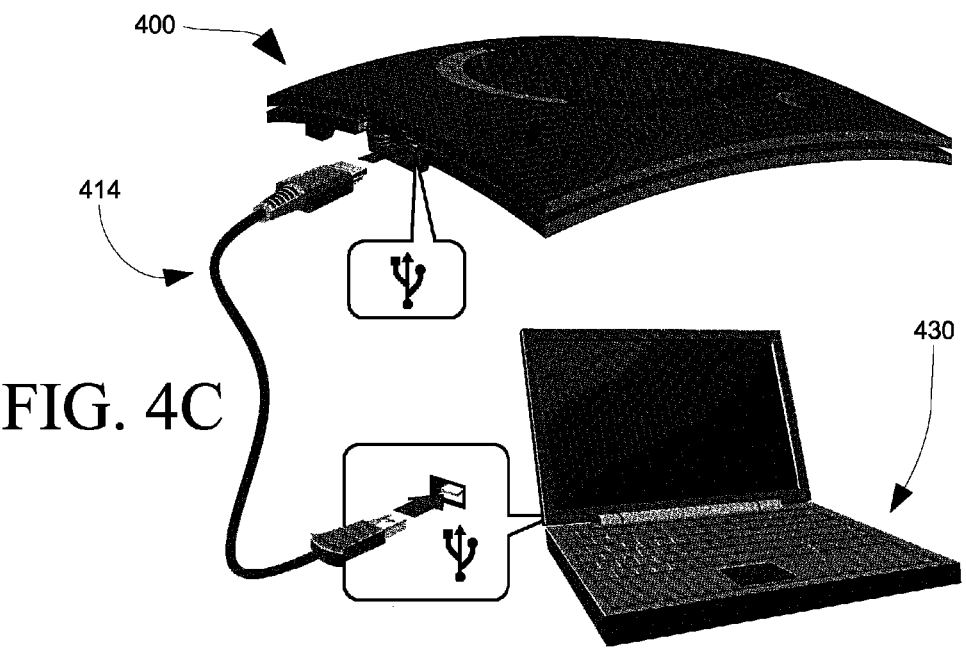
FIG. 4C depicts the conferencing pod of FIG. 4A wherein the breakout box is configured to connect to a computer.

In a second configuration shown in FIG. 4C, pod 400 is connectable to a computer 430 through a USB cable 414. In this way, pod 400 may be made operable with a softphone on computer 430 by making speaker 404 an output audio device of the computer and microphones 406a, 406b and 406c as input audio devices to the program. Pod 400 receives its power through cable 414, which is configured to connect to a USB port of the computer 430. Note that in this example cable 414 is also used in the telephone configuration, although there power is not supplied from a computer but from an external power source.

Figure 4D:
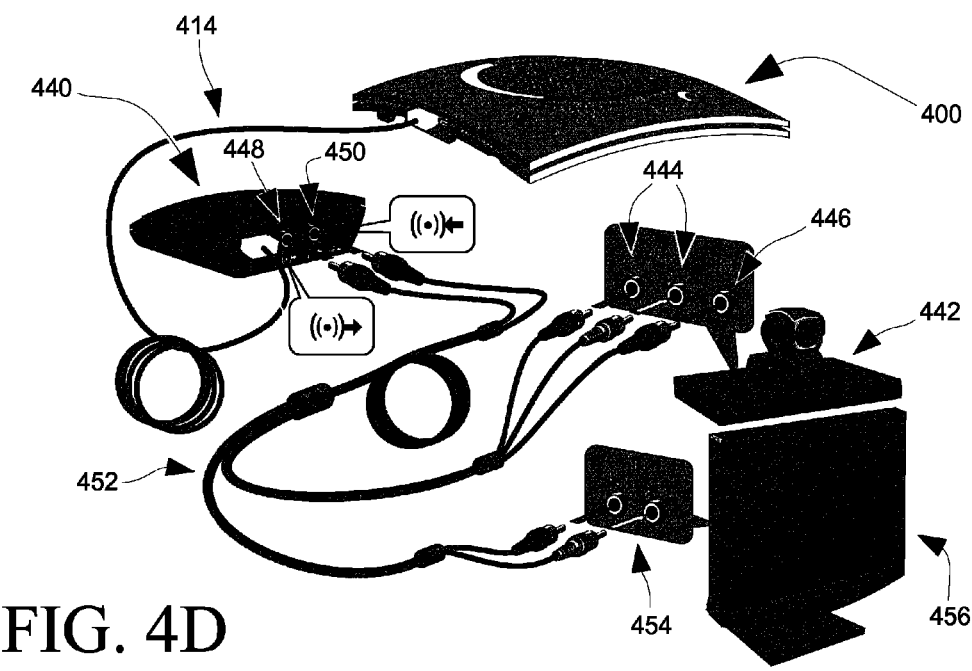
FIG. 4D depicts the conferencing pod of FIG. 4A wherein the breakout box is configured to connect to a videoconferencing telephonic device.

Now turning to FIG. 4D, a third configuration is shown for using pot 400 as part of a videoconferencing device. For this application a videoconferencing breakout box 440 is provided which connects to pot 400 using the same cable 414 and utilizing an external power source, not shown. In this example videoconferencing device 442 provides a video camera and connectors providing audio out 444 and receiving audio in 446. Included in videoconferencing breakout box 440 are an audio output connector 448 and an audio input connector 450. A cable 452 is provided that interconnects audio inputs, 450 and 446, and outputs, 448 and 444, so as to deliver local audio picked up by microphones 406a, 406b and 406c to videoconferencing device 442 and distant audio from videoconferencing device 442 to pod 400 and speaker 404. Also included in cable 452 are connectors for connecting to audio input connectors 454 included in monitor 456 should it be desired to use speakers included in the monitor rather than in the pod.

Thus it may be seen from the first exemplary product that a conferencing pod may connect both to a telephonic device and a non-telephonic device. For some non-telephonic devices it may be that a sidetone is not generated, and thus providing sidetone suppression is not appropriate. However, if a sidetone suppressor is adaptive to the conditions experienced it may be that a sidetone suppressor may remain enabled with adequate performance even though a sidetone generator is not present. An optional feature present in conferencing pod 400 is a setting that enables and disables the sidetone suppressor, which feature is settable in the configuration of FIG. 4C through software. Other methods of enabling and disabling a sidetone suppressor may be used as desired.

The exemplary product of FIGS. 4A, 4B, 4C and 4D may be used with analog telephones, digital telephones, packet-switched telephones, videoconferencing systems, network telephones, softphones, voice over IP telephones and software applications, Internet conferencing applications and others in interactive conversational mode with a distant participant. This product may also be used as an attachable microphone and/or speaker to a computer or other device, for example to create an audio recording and/or playback device. Other products described herein can likewise be used. Additionally, other breakout boxes might be designed to accommodate other communications devices, and the inventions described herein are not limited to the particular exemplary products so described.

Figure 5A:
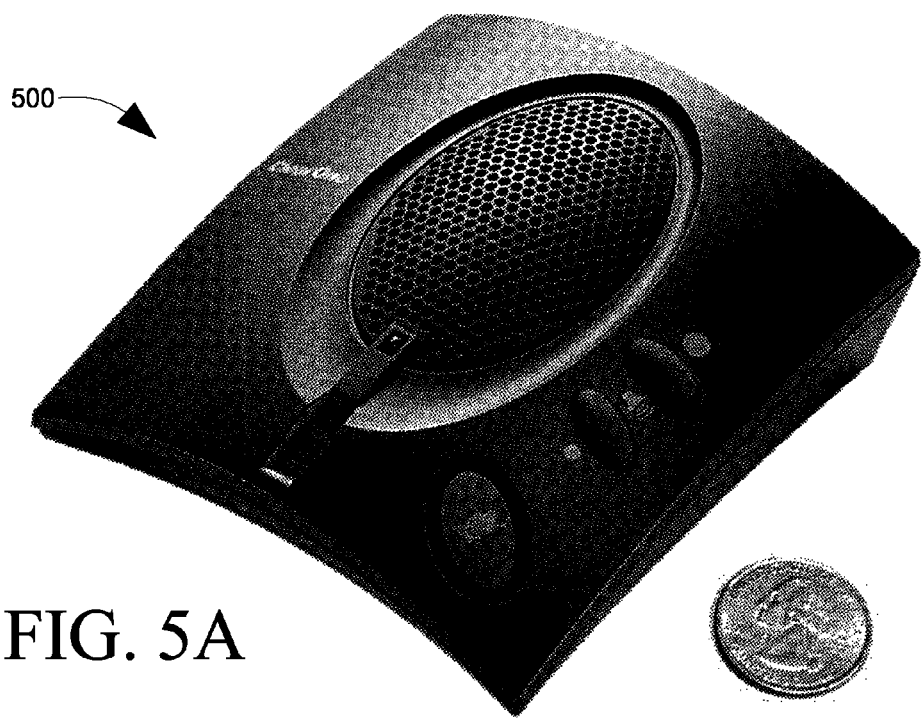
FIG. 5A depicts a second exemplary portable teleconferencing pod in relation to a U.S. quarter.
Figure 5B:
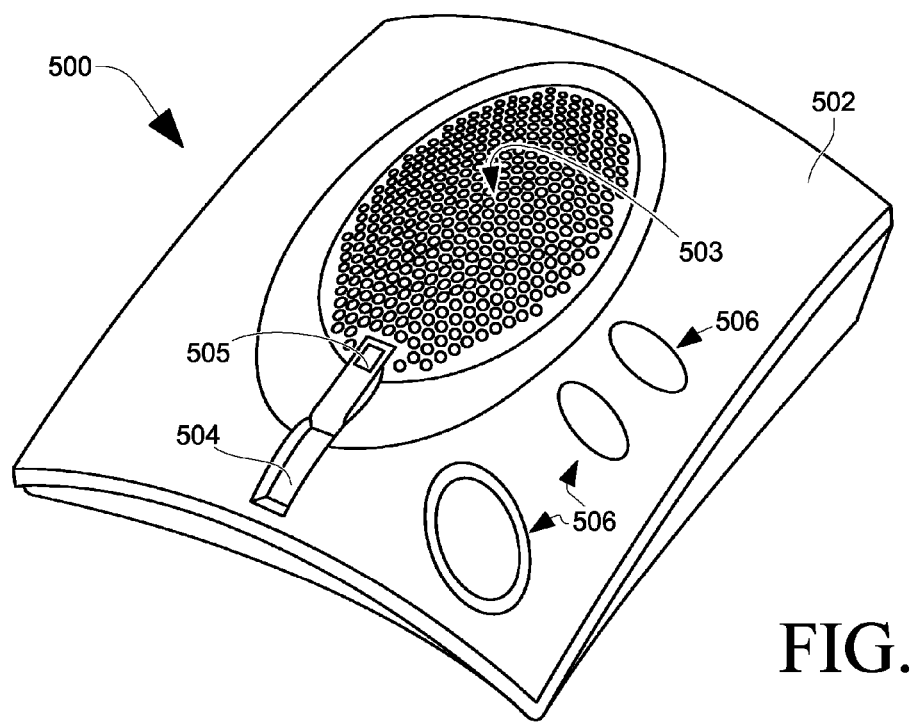
FIG. 5B shows external parts of the product of FIG. 5A.

A second exemplary product, to which the inventions described herein may be applied, is intended as a portable and versatile speakerphone product 500, and is relatively small as can be seen in FIG. 5A in comparison to a U.S. quarter. Referring now to FIG. 5B, that product includes a housing 502, an audio speaker 503, a microphone 504, and operational indicator light 505 and control buttons 506 permitting the control of speaker volume and mute on/off. Note however, this example does not include a breakout box for separating connectors as in the first exemplary product, rather connections are restricted to those provided in the product 500 itself.

One difference between product 500 and other products through which a teleconference might be attempted is that this product is designed to be personally adaptable. Most teleconferencing products are designed with a particular channel in mind, for example an ordinary telephone line or its recent substitute, Voice Over Internet Protocol (VOIP). Thus, an ordinary teleconferencing product will include a port to interface with a single channel. This product provides an interface to several channel types, by which a user can make a connection to one of several or more channels that happen to be available at the moment.

Figure 5C:
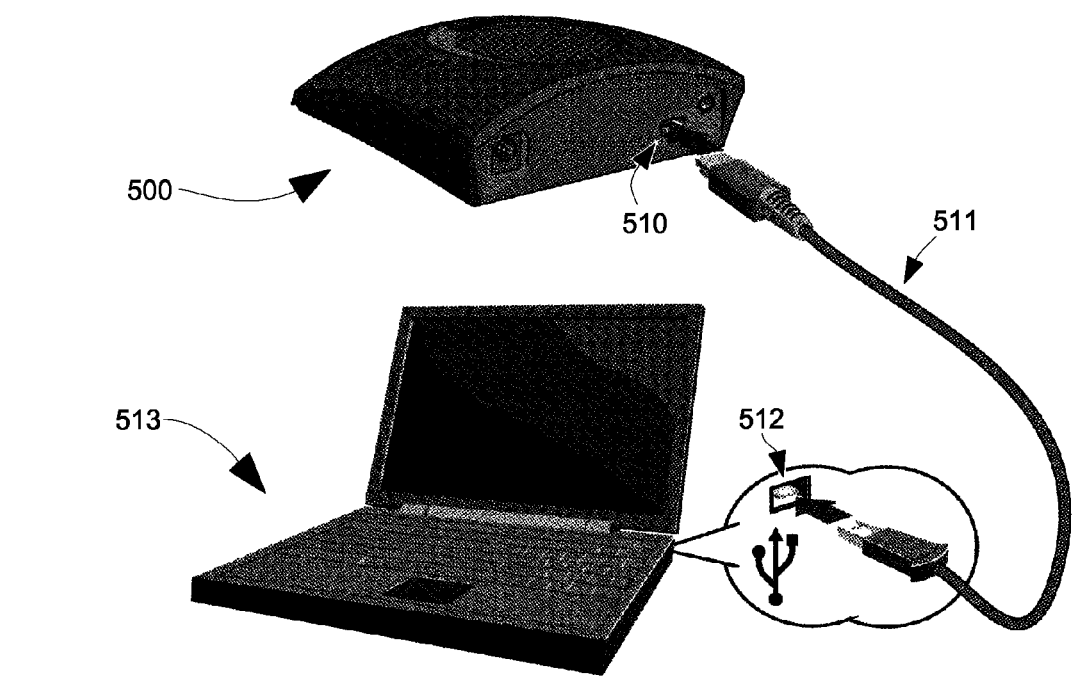
FIG. 5C depicts the conferencing pod of FIG. 5A configured to connect to a computer.

Referring now to FIG. 5C, product 500 is connectable to a computer, for example laptop 513, by way of a Universal Serial Bus (USB) connection. That connection is made by way of cable 511 connecting a first port 510 in product 500 and a port 512 in the computer 513. In this connection configuration, product draws its power through the USB cord 511, and no external power supply is needed unless the port 512 is not a powered USB port (supplying 500 mA at 5V or 2.5 W) Computer 513 includes software, which may include a driver, that provides for digital communication between product 500 and the audio system of the computer 513, through which audio information input at microphone 504 is made available to computer 513 and audio output information as provided by computer 513 and software running thereon is produced at speaker 503. For example, computer 513 may have an audio subsystem made available to applications generally. Driver software may provide an item in a pull-down menu list of input and output audio selections, and thereby a user can select microphone 504 as input and/or the speaker 503 as output for applications running on the computer generally.

Alternatively, application software may provide for specific input or output through the product 500. For example, a VOIP soft phone may utilize the product's speaker and microphone, while other applications utilize the general settings for the computer's speakers and microphone, if those are connected. As will be seen, configuring the audio between general audio channels from the speaker phone channels makes possible certain effects.

Figure 5D:
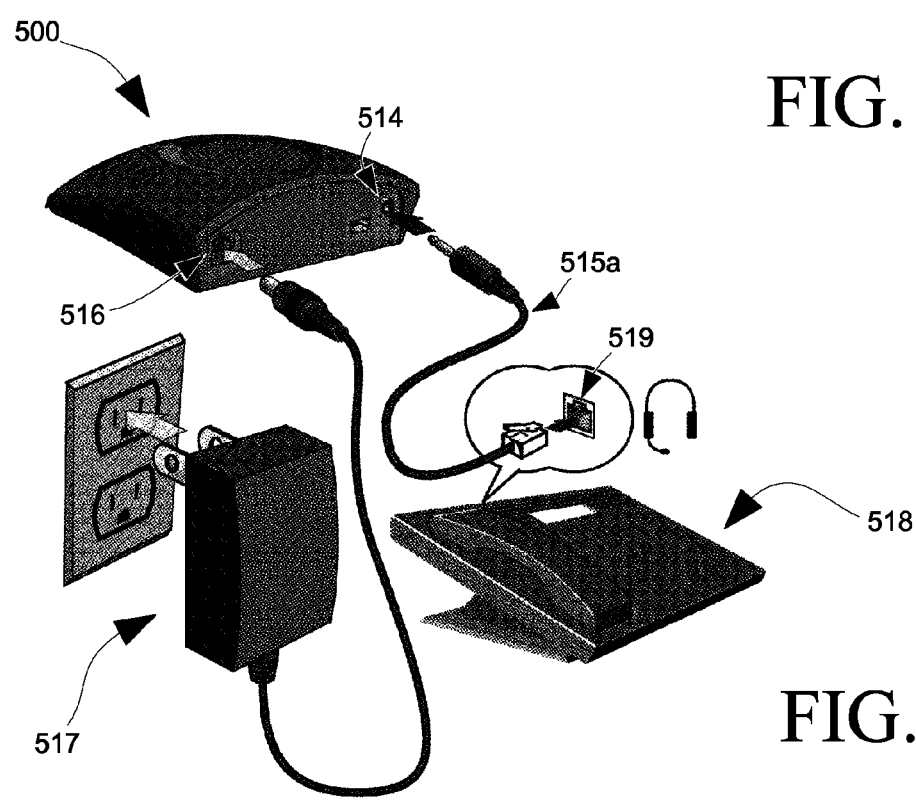
FIG. 5D depicts the conferencing pod of FIG. 5A configured to connect to a headset connection of an external telephonic device.

Continuing to FIG. 5D, the product 500 is connectable to a telephone 518 in place of a handset or headset jack 519 by way of cable 515a insertable to port 514 in the product 500. In this configuration, an external power supply 517 is provided for socket 516, although other power sources could also be designed into a portable conferencing device such as batteries. In this configuration the product 500 emulates a headset device, receiving and producing analog signals at voltages, currents and impedances suitable for telephone 518.

Figure 5E:
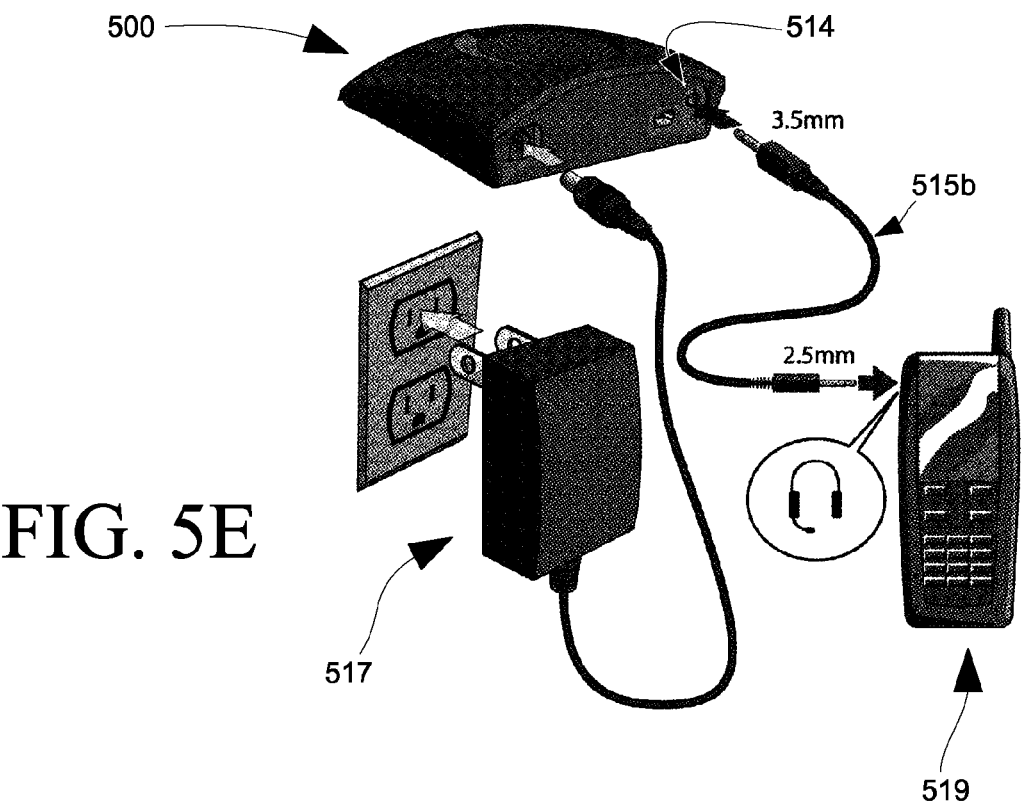
FIG. 5E depicts the conferencing pod of FIG. 5A configured to connect to a cellular telephone.

Now referring to FIG. 5E, the product 500 may also function as a speakerphone utilizing a wireless telephone 519, which might be a cellular or a cordless telephone. The product 500 is connectible with not only telephones, but with other media devices, as will become clear below. A different cable 515b is used to make the connection between the product 500 and the telephone 519. Cable 515b includes and presents three conductors through its jack connectors: an input, an output and a ground. Cable 515a, intended to emulate a handset, includes four connectors at the telephone side, but three connectors at port 514 by tying a speaker and a microphone line together, for example at the negative (ground) polarity.

Figure 5F:
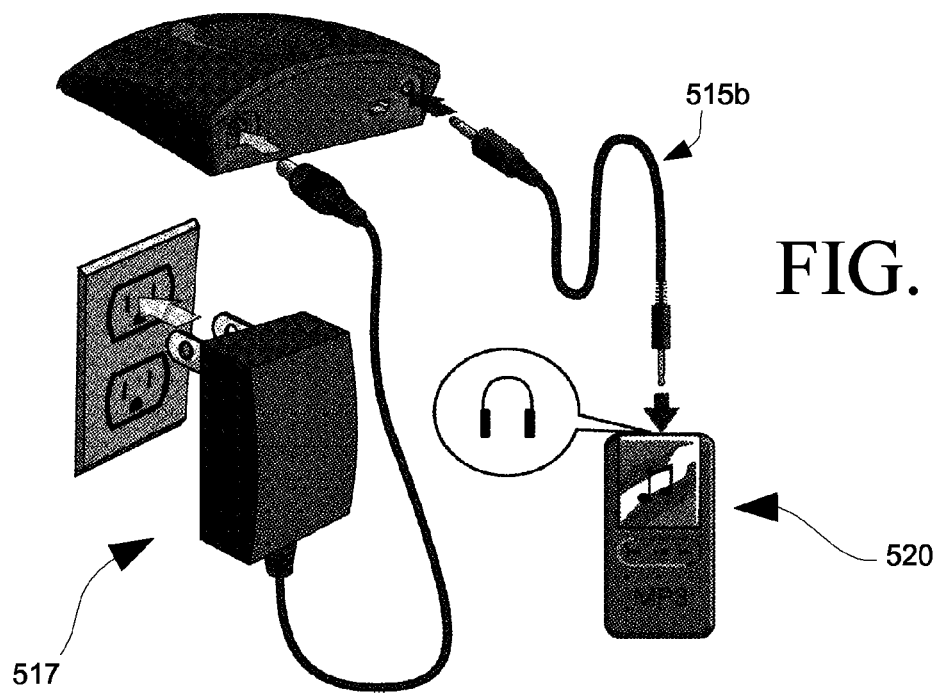
FIG. 5F depicts the conferencing pod of FIG. 5A configured to connect to a source of audio playback.
Figure 5G:
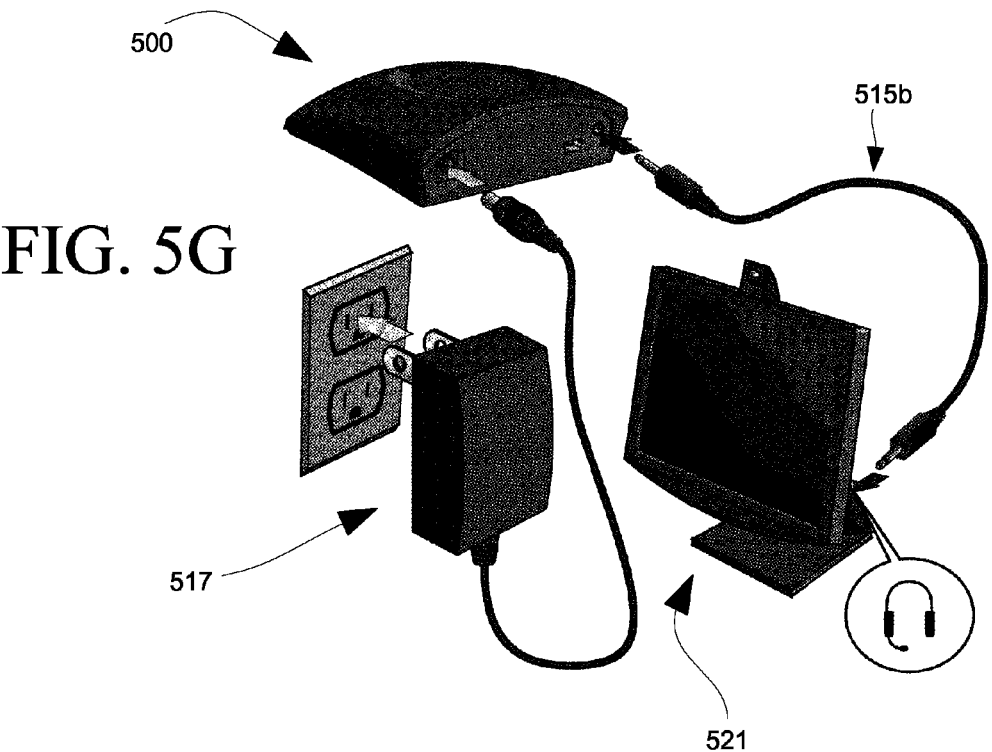
FIG. 5G depicts the conferencing pod of FIG. 5A configured to connect to a videoconferencing telephonic device.

Cables 515a or 515b could include one or more resistive elements for impedance matching between the speakerphone device and the telephone. If that is done, a cable will become compatible with a set of media devices, but may not function properly in others. For example, it may be desirable to connect a speakerphone device to a music player 520 as in FIG. 5F or to desktop video conferencing device as in FIG. 5G. A cellular phone 519 or an audio player 520 may be configured to be connected to a small speaker, which presents a relatively low impedance as compared to an audio source at "line" levels. Likewise, a media device might accept an input directly from a microphone, such as is done for most telephones, while other media devices might accept an amplified audio source such as the video conferencing device 521.

To achieve improved compatibility with media devices of various kinds, the product 500 is designed to vary its driving and/or gain characteristics on port 514, whereby a single cable 515b may be used for devices having that particular end connector, which in this example is a stereo 2.5 mm male connector. Those port characteristics are programmable through a microcontroller embedded within the product 500. That product is designed to be configured through a USB connection made through port 510. That configuration includes the adjustment of the input and output audio voltage/gain levels, enabling/disabling the mixing of the USB and analog port audio, enabling/disabling line echo cancellation, and disabling the product's speaker 503, some of which features will be further described below. In the product 500 the input and output audio lines are current-limited with in-line resistors, therefore modification of the audio gain levels has the effect of matching the input receiver of a selected media device. In comparable devices, matching may be through gain-adjustable amplifier circuits, current sources or sinks, or any other method. Gain matching may also be adaptable, through the use of an automatic gain control, if desired. An output bandwidth of approximately 150 to 15,000 Hz and an input bandwidth of about 50 to 8,000 Hz provides a good range for playing music and for picking up speech.

Figure 7:
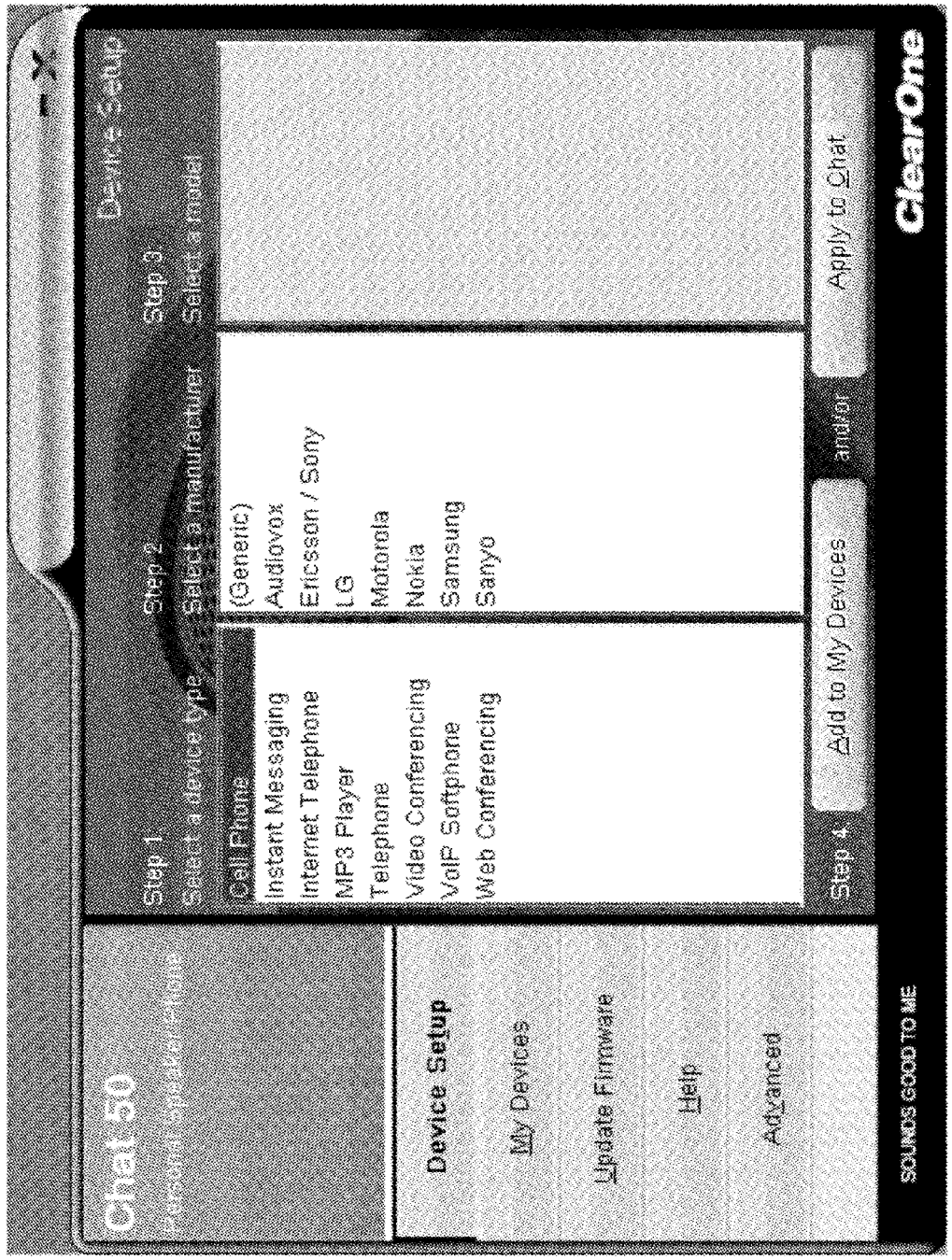
FIG. 7 depicts a screen of exemplary teleconferencing product software allowing configuration for connection to various audio devices.

The host software of products 400 and 500 include a database of settings suitable for a number of media devices. Selection is made in a screen as shown in FIG. 7. The user is directed to select first a media device type, which in this screen includes the cell phone, instant messaging, internet telephone, mp3 player, regular telephone, video conferencing, VOIP softphone and web conferencing types. Upon selection of a type, a user may select a manufacturer and a model corresponding to the media device intended to be connected to the product. On selection of a device, the user clicks on the "Apply" button to download the configuration suitable for the selected device to the product. A user is permitted to vary the settings for a media device or add a new device through the "advanced" menu, not shown.

Both of the exemplary products include echo cancellation, such as that described below, auto-leveling of microphone inputs, noise cancellation and full-duplex operation. It is to be understood that the echo cancelling systems and concepts described below are optional and exemplary, and stand separate from the inventions described and claimed herein.

Echo Cancellation

Again, products disclosed above include an echo canceller, which allow for increased audio quality in full-duplex operation by preventing certain echos from reaching a distant party. Some echo cancellers may utilize a finite-impulse response (FIR) filter and others might use an infinite-impulse response (IIR) filter, which filters include a number of coefficients representing the sum of the echo paths in the environment of the product in operation. The echo canceller may produce an echo cancellation signal, which is a continuous signal that is either added to or subtracted from the signal received at the one or more microphones.

For those products implementing an FIR or IIR echo canceller, the coefficients are adapted or converged over a period of time where there is incoming audio from a distant participant but silence in the product's local vicinity. The adaptation of coefficients may be through a converger or adapter that applies an iterative method to arrive at an echo cancelation solution. Coefficient adaptation may be controlled such that those coefficients are adapted generally where there is a substantial far-end audio signal and no detected sound produced in the local environment.

A doubletalk detector may be included to discriminate between a condition of far-end audio only, called far-end singletalk, and a condition of audio on the near and a far-end of the conversation which is called doubletalk. The doubletalk detector may track the conversation between conferees to identify appropriate times to engage coefficient adaptation.

In certain portable products, a speaker and microphone will be present in the same enclosure, and audio will be coupled directly between a speaker and a microphone. Those portable products may be quite small, sometimes small enough to place in a briefcase, purse or pocket.

Figure 6:
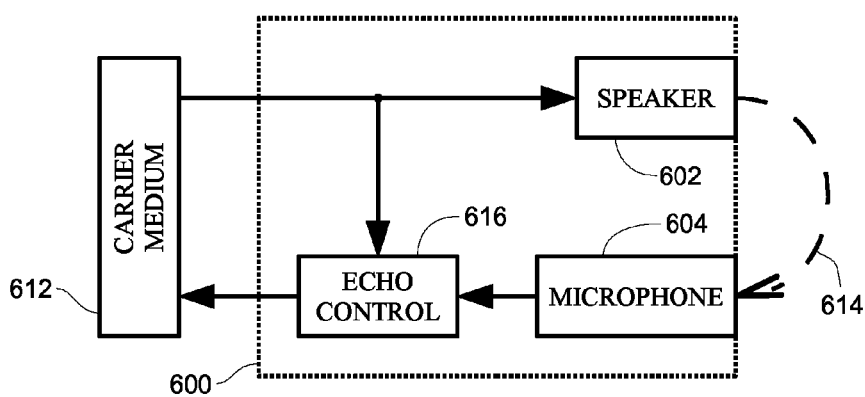
FIG. 6 conceptually illustrates the elements of echo cancellation in a conferencing device.

FIG. 6 serves as an introduction to the concepts of echo cancellation, depicting the elements of one side of a conferencing system. A conferencing device 600 is connected to a far-side participant through a carrier medium 612, which might be a telephonic channel, for example. Near-side audio is received at microphone 604 and delivered to the far side device at times through medium 612. As far-side audio is received, device 600 produces audio at speaker 602. The sound produced at speaker 602 is picked up by microphone 604 through a feedback path 614. Thus, the far-side participant will hear an acoustic echo of himself with approximately two-times the carrier medium latency plus path latency 614, if production of sound received from path 614 is not controlled or cancelled.

Device 600 may include an echo controller 616 for reducing acoustic echo. Standard methods of control include operation at half-duplex, and operation at full-duplex with echo cancellation. Half-duplex operation simply cuts off the sound received at microphone 604 when the audible volume at speaker 602 exceeds a pre-selected threshold. Many conferencing products implement half-duplex operation, however that operation carries a disadvantage that participants at only one side of the conference can be heard at any time, and neither side can interrupt or acknowledge the other.

When possible, it is therefore preferable to apply echo cancellation to achieve full-duplex operation. In digital audio systems, echo cancellation can be performed by subtracting off, at controller 616, a modified version of the signal produced at speaker 602, leaving only near-side audio. A conceptual method of cancellation merely applies an attenuation and a delay to the outgoing audio, accounting for the delay and attenuation of feedback path 614. However, in the real world path 614 is complex, including dispersed components from reflections off the several surfaces and persons in proximity to the speaker and microphone.

To deal with that complexity, controller 616 ordinarily implements echo cancellation through use of a finite impulse response (FIR) filter, with the received far-side audio signal as input. The FIR filter utilizes a finite number of coefficients of a length sufficient to cover the longest path 614 of significance expected in operation. The reader should recognize that acoustic echoes will be, in general, of longer duration and greater complexity than line echoes. An acoustic echo canceller therefore requires a much larger number of coefficients to provide echo cancellation, which might cover a number of seconds in a device designed for operation in high-echo rooms (rooms with parallel walls and no carpeting.) These coefficients are applied to a copy of the incoming audio, providing the predicted echo component received at the microphone. The determination of these coefficients is by an iterative method, generally understood by those skilled in the art, and will not be further described here for the sake of brevity. In theory, the FIR coefficients could be determined by the application of a step function to the speaker and a recording of the received audio (in reverse) received at the microphone.

In practice, however, the convergence of the FIR coefficients depends mainly on the presence of an incoming audio signal and the general absence of near-side sound apart from that produced by the device's speaker. This may be performed by measuring the incoming (distant) audio level, the microphone audio level received at the microphone(s), and the audio level following the echo canceller. An indication of good FIR coefficient adaptation is a high volume detected before echo cancellation and a low volume afterward, which can generally only occur if there is significant coupled far-side audio in the absence of near-side audio.

To avoid non-convergence or divergence of the FIR coefficients, the convergence operation should be enabled while there is an incoming far-side signal, with near-side audio at a volume about less than the desired degree of echo cancellation. Operation in the presence of a near-side signal may introduce random errors into the coefficients, while operation with a weak far-side signal can result in a non-converging filter. The second general condition of operation is that convergence should not proceed while there is a substantial near-side signal. Thus, if the FIR coefficients are well-adapted, the system can detect this condition again by periods of high amplitude at the microphone and low amplitude in the echo-cancelled signal. If badly adapted, such a condition will generally not occur, and the levels before and after the echo canceller may track each other or even have a higher after-echo canceller amplitude, in which case the echo canceller is producing echo. Regardless of the state of the echo canceller, the system can detect the presence of near-side audio in the absence of far-side audio, because a high-amplitude signal will be received at the microphone and a low-amplitude signal will be received from the distant conference device. A double-talk detector may also be used to discriminate other cases where both sides of a conversation may be speaking.

Sidetone Suppressors

Figure 8A:
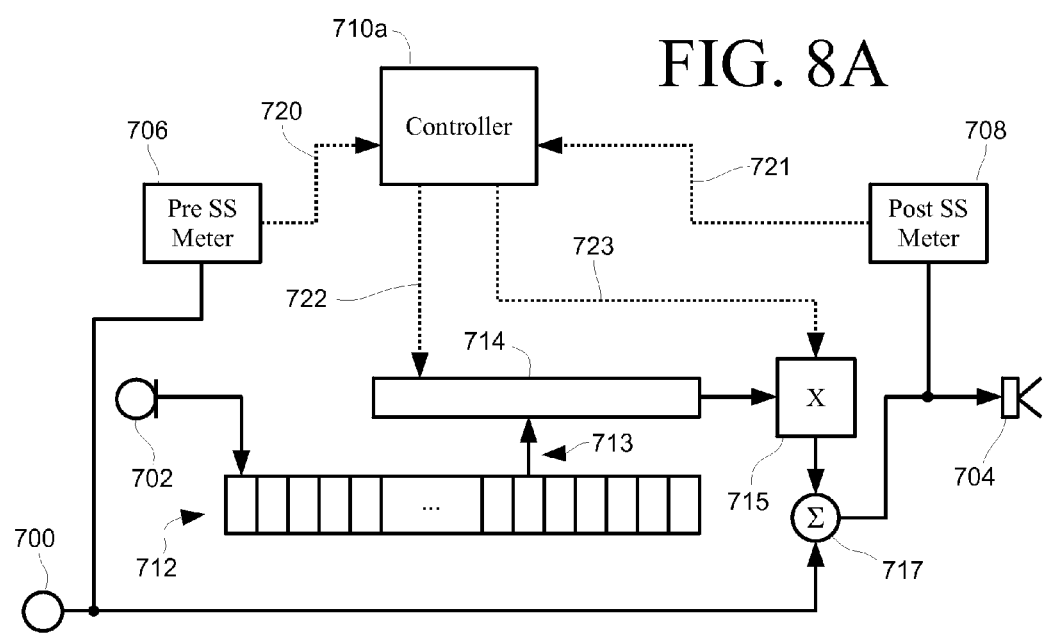
FIG. 8A shows the interaction of elements of a simplified sidetone suppression system.
Figure 8B:
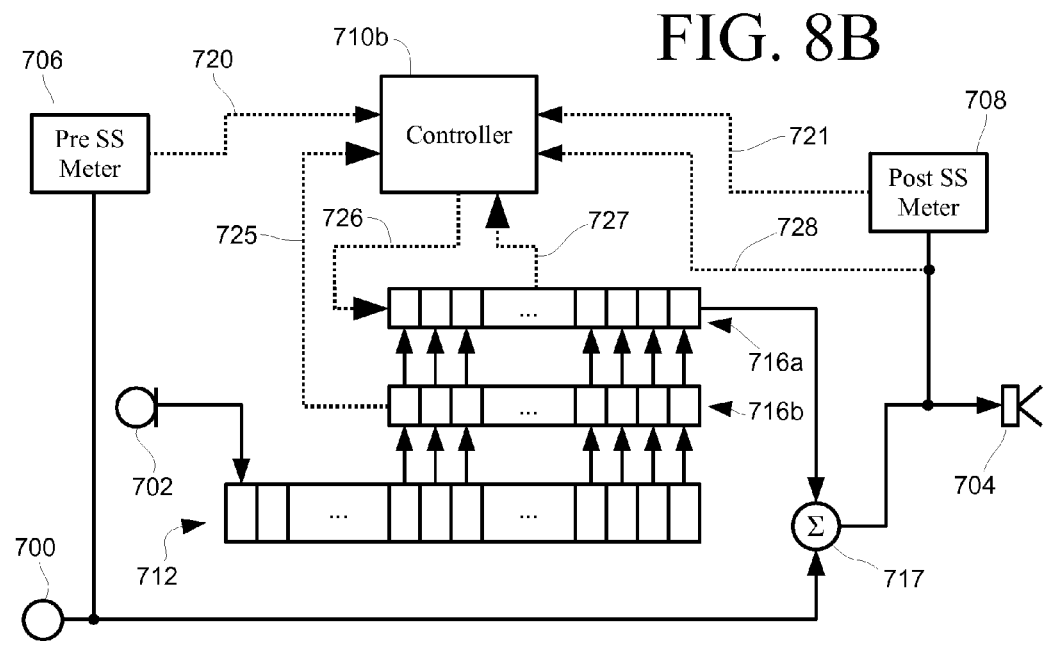
FIG. 8B shows the interaction of elements of a sidetone suppression system that applies a coefficient profile to generate a suppression signal.

The inventions described herein are operable with a sidetone suppressor, which is a component that reduces the volume of a generated sidetone as perceived by a person. Two exemplary sidetone suppressors are shown in FIGS. 8A and 8B, representing two of a large number of suppressor types that may be used; which examples are presented here mainly to introduce concepts that will be understood by one of ordinary skill in the art. Both examples include an input port 700 or receiving an audio signal that potentially includes a sidetone. Also in both is a microphone input 702 and a speaker output 704. An input buffer 712 buffers a number of samples from the microphone 702, with a length sufficient to store the number of samples that will occur through one sidetone loop, which loop is the feedback path between the microphone 702 and the appearance for its duration of a sidetone on input 700.

In the first exemplary suppressor of FIG. 8A a controller 710*a* reads certain inputs and produces certain outputs. A meter 706 measures the volume level in the audio signal received at port 700, and another meter 708 measures the volume level in the sidetone-suppressed signal produced at speaker 704. Thus, the pre-SS and post-SS meters provide information whereby it may be determined whether effective suppression is occurring, because a low volume level will be seen following the suppressor or higher volume level is received at input 700. Controller 710*a* reads 720 the pre-SS meter 706 and also reads 721 the post-SS meter 708 to, among other things, determined whether effective suppression is occurring.

In this example sidetone suppression is accomplished by an offset buffer of one sample 714, a scaler 715 in the summer 717. Controller 710*a* controls 722 the offset 713 into buffer 712, thereby presenting an audio sample from input port 700 to scaler 715 at a delay corresponding to the sidetone loop, i.e. the time it takes for a sound received at microphone 702 to appear input 700. Controller 710*a* takes measures to match the offset 713 with the actual sidetone loop in operation. Controller 710*a* also controlled scaler 715 to match the attenuation that is provided by the sidetone generator, for which meters 706 and 708 are used.

The example of FIG. 8A represents a very simple sidetone suppressor, suitable in situations where a sidetone generator produces a sidetone that is an identical or close replica of a microphone signal, after scaling and a delay. It could be the case, for example, where the system from the microphone 700 to the input 702 is entirely digital. However, it is foreseeable that a portion of the sidetone will include analog components such as wires carrying an analog signal with an associated capacitance, resistance and inductance, and also filters and other circuits that distort and spread the signal. Some compensation can be rendered by the application of a smoothing filter to the samples placed in buffer 712, which may be sufficient for some applications.

A more robust sidetone suppressor can be constructed, as shown in FIG. 8B. This exemplary suppressor includes the same input port 700, microphone 702, speaker 704, meters 706 and 708, and buffer 712. However, in this example an array of coefficients 716*a* is provided that performs the functions of buffer 714 and scaler 715 in the prior example. Each coefficient is applied to a buffer 716*b*, which buffer is reloaded from the master buffer 712 and coefficients applied for each sample received at microphone 702. Each coefficient of array 716*a* represents a scaling factor at its particular offset, and thus the suppressor of FIG. 8B is capable of suppressing sidetones that are distorted and/or more complex. Each coefficient is multiplied with its corresponding sample in buffer 716*b*, which products are summed to form one sample in a suppression stream applied at summer 717.

Controller 710*b* adapts 726 the coefficients of array 716*a* to match the sidetone received at port 700. This may be through an iterative method that converges on a solution in a particular time, which time may be selected to be sufficiently short at initialization to rapidly suppress sidetones but long enough to avoid coefficient divergence on spurious events. The inputs to that iterative method may be the samples 725 received at microphone 702, the samples 727 following application of the coefficient array 716 and the resulting sample stream 728 after application of summer 717. Meters 706 and 708 may still be used to measure the effective suppression.

Recognize now that the examples of FIGS. 8A and 8B are adaptive; controllers 710*a* and 710*b* adapt the sidetone suppression to the sidetone existent at port 700. In a fixed system, with an understood sidetone having a known attenuation and delay, adaption may not be needed. However, referring back to FIG. 3, where a conferencing pod 302 is to be connected to a telephone 304 with unknown sidetone generation, adaption is appropriate. Adaption is best performed under conditions where only local participants are speaking and distant ones are silent, so controllers such as 710*a* and 710*b* converge and/or adapt to signals related to the sidetone. The condition of having local audio in the absence of distant audio is referred to as near-end singletalk, as opposed to the conditions of far-end singletalk or doubletalk. It is to be recognized, however, that some noise will always be present in the system and adaption should not be prevented where a modest amount of distant noise occurs, particularly where a microphone signal is significantly above a measured or expected noise floor.

Sidetone Transition Detection and Countermeasures

As suggested above, a conferencing product can be adapted to interface with ordinary telephonic equipment, for example functioning as a headset or handset. (Herein, a "set" refers to one or more microphones combined with an earpiece that delivers sound at a relatively low power to a person's ear.) For example, the second exemplary conferencing pod is attachable to a telephone at the headset jack 519, as shown in FIG. 5D. Other equipment to which a portable teleconferencing device could be attached includes a cellular telephone, an intercom, a soft phone and many other multi-party devices.

A portable conferencing device might be connected to equipment that does not have a sidetone generator with consistent characteristics. For example, a portable conferencing device might be attached to a telephone having more than one line, each line having a separate sidetone generator. Alternatively, a portable conferencing device might be attached to a telephone in a PBX network having many lines and many potential sidetone configurations. In those configurations a user might switch from one line to another and thereby switch between two sidetone generators with different characteristics. Even if a portable conferencing device is not used in equipment having only one line, a sidetone generator may be intermittently present in the case where a telephone has a hold or privacy feature where local sounds are not reproduced. In such equipment, the interruption of sidetone might also be accomplished by disabling the audio output amplifier, or by sending a flat audio signal or a signal other than one containing a sidetone. Under conditions of such a sidetone interruption, an echo canceller can lose adaption to the sidetone, for example where the echo canceller is programmed to decay back to a default state.

Referring again to 2C, consider the following example where a portable conferencing device is connected to telephonic equipment having more than one line and a hold feature. A local participant makes a connection with a distant party and holds a conversation for several minutes, during which sidetone suppressor 218 adapts to the characteristics of the sidetone generator 210. The local participant then decides that he needs to have a private conversation with someone in his office, and places the call on hold.

The local participant now makes a connection with the person in his office, but here there is no sidetone generator present in the system, resulting in the situation shown in FIG. 2D. When the far side office participant begins speaking, that signal 221 is carried and produced at the speaker 203 and picked up at microphone 201. However, now the sidetone suppressor is still adapted for the presence of a sidetone generator, and signal 221 includes no sidetone. Suppressor 218 therefore overcompensates and actually produces a local sidetone at the same level as the sidetone generator would produce. The local participants then suffer the distracting and annoying effects thereby.

Thus it is now herein recognized that it may be that a sidetone generator is only intermittently present in a system, and might be effectively removed through participant action by a muting function on the telephone without indication to a sidetone suppression system. Again, there are two deleterious effects to continuing operation after withdrawal of a sidetone generator, which are generally effective generation of a false-sidetone by the suppression system and possible mal-adaption. These effects can be avoided if the sidetone suppression system can generate its own indications of sidetone transition events, i.e. the removal or introduction of a sidetone generator. By recognizing sidetone transition events, a conferencing pod may compensate by control logic for an intermittently-present sidetone generator, which control logic in combination with a sidetone suppressor is an intermittent sidetone compensator.

A method of detecting sidetone transitions will now be described, with reference to a system shown in FIG. 9A. In that system, a local participant 910 may interact by speaking into a microphone 902 and listening to a speaker 908. An input port 904 and an output port 906 connect to a telephonic device, not shown, receiving and sending an audio signal thereto. Thus, in this example, all the components shown between ports 904 and 906 and user interactive elements speaker 908 and microphone 902 are included in a conferencing pod. A sidetone suppressor 912 provides sidetone suppression for a signal received at input port 904. Also in this example, a bypass switch 920 is provided whereby the output of speaker 908 can be selected to be the output of suppressor 912 or the unmodified signal received at input port 904.

Figure 9A:
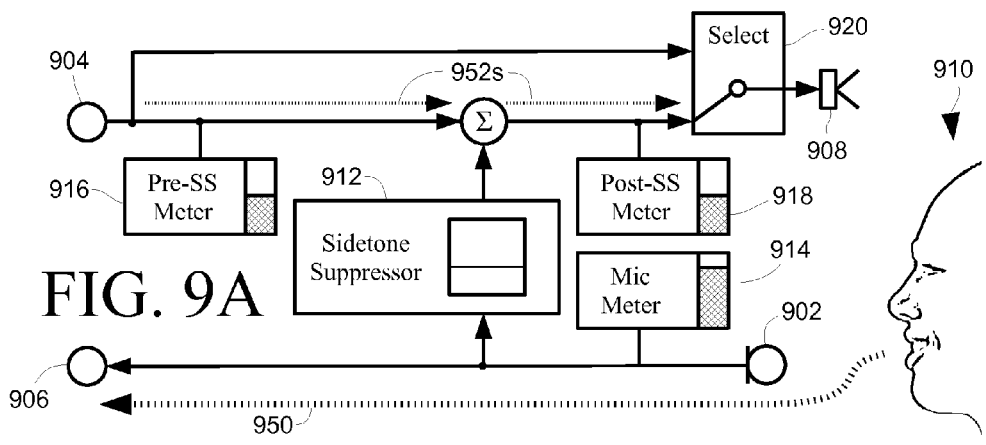
FIG. 9A illustrates the elements of an exemplary sidetone suppression and compensation system in an initial state in the presence of an externally-generated sidetone.

Further in the system of FIG. 9A, meters 914, 916 and 918 are provided to give an indication to the system of audio levels experienced at various locations. A microphone meter 914 measures the volume of sound received at microphone 902. A pre-sidetone suppressor meter 916 and a post-sidetone meter 918 measure the audio levels before and after the application of sidetone suppressor 912. The system state shown in FIG. 9A is an initialization state, with a non-adapted sidetone suppressor 912. In this state, a local participant 910 is producing local audio 950, which is being returned in the form of a sidetone 952s. Here, the sidetone 952s reaches switch 920 because the output of suppressor 912 is not effective. In this condition, a microphone meter 914 reads high and the pre- and post-meters 916 and 918 also read high, but at a lower volume than the microphone meter 914 because the sidetone 952s attenuated. In this condition to system may maintain switch 920 in a state that allows the output of sidetone suppressor 912 to reach speaker 908 so that adds suppressor 912 becomes adapted the best signal is presented to the local participant 910.

Figure 9B:
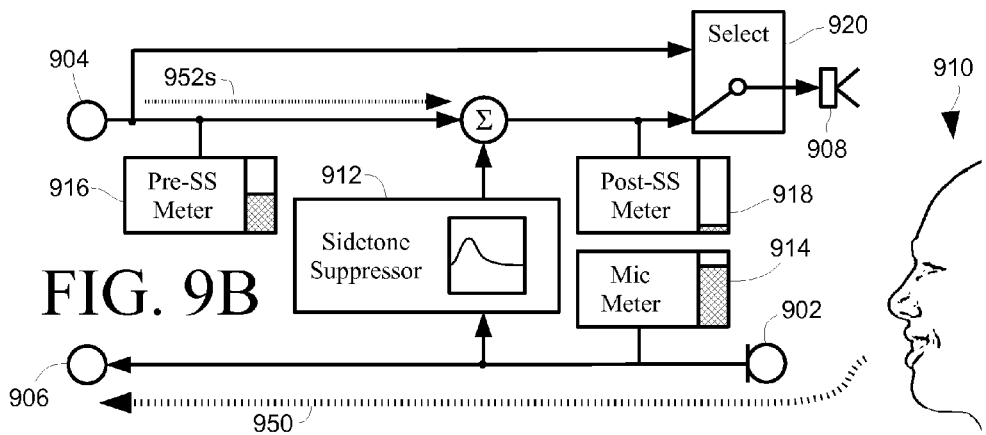
FIG. 9B illustrates the condition of the system of FIG. 9A after suppressor adaption to the sidetone.

Now turning to FIG. 9B, as the suppressor reaches adaptation the pre-suppressor meter 916 will continue to read high in the presence of local participant audio 950, but the post-suppressor meter 918 will read low. Thus, the sidetone 952s does not make it past the mixer of sidetone suppressor 912. In this condition is appropriate for switch 920 to be in a position that allows the suppressed audio from 912 to be applied to speaker 908.

Figure 9C:
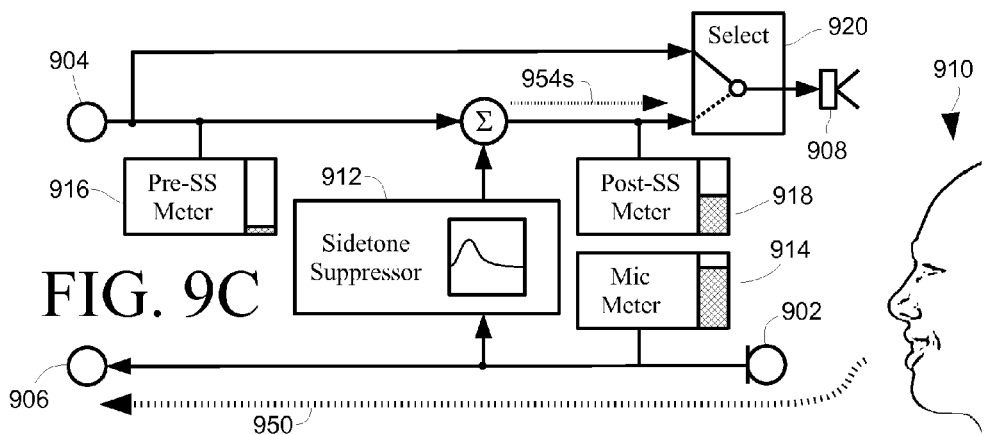
FIG. 9C illustrates the condition of the system of FIG. 9A after suppressor adaption followed by removal of the external sidetone and remedial action.

The removal of the external sidetone generator leads to the condition shown in FIG. 9C. There, the local participant is speaking and generating local audio 950. But as there is no sidetone, the pre-suppression meter 916 reads low. As discussed before, in the circumstances sidetone suppressor 912 injects a suppression signal which results in a signal 954s appearing after the sidetone suppressor 912, causing the post suppression meter 918 to read high. Signal 954s is referred to as an echo signal, as it is generally heard as an echo of the local participants speech. A low pre-suppression level in combination with a high post-suppression level is a null-sidetone indication. Detection of a null-sidetone may be prevented where meter 918 reads substantially less than or equal to meter 916, for example by selecting a threshold ratio between these two meters that consistently filters out cases where a null-sidetone is not present. By these readings the system can determine that an indication that the sidetone generator has been removed, which is a sidetone transition event. The decision on whether a sidetone generator has been changed (either introduced or removed) by be made over a period of time; rather than applying an instantaneous test, information may be averaged over time and delays or hysteresis may be applied in accordance with the performance of a particular conference system.

On detecting a sidetone transition event the system may take remedial steps. These include bypassing the sidetone suppressor 912, in this case by switching selection switch 920 to send the signal received at port 904 to speaker 908. Another remedial step is to hold adaption of sidetone suppressor 912, as the adaptive process is now deprived of an input. Thus, the state of suppressor 912 may be maintained in readiness in the event that the sidetone generator should be reconnected. Other steps may be taken on a sidetone transition detection (either on departure of a sidetone generator or a reintroduction), including the resetting of suppressor coefficients and/or increasing the rate of adaption of those coefficients.

Figure 9D:
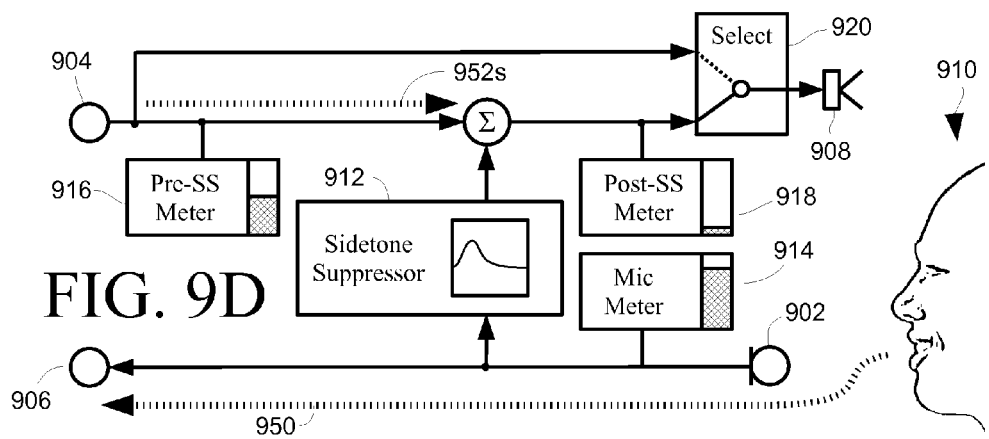
FIG. 9D illustrates the condition of the system of FIG. 9A after suppressor adaption following an interruption and return of an external sidetone.

Now turning to FIG. 9D, a sidetone generator may return and produce a sidetone 952$s$, again yielding a high meter reading before the suppressor and a low reading afterward. Being in a state of bypassing suppressor 912, and recognizing that a local participant is speaking by high meter reading at the microphone 914, the system can determine an indication that the sidetone generator has been replaced, which is also a sidetone transition event. Having this indication system ceases to bypass suppressor 912 by returning switch 920 to its normal, unbypassed position.

Figure 9E:
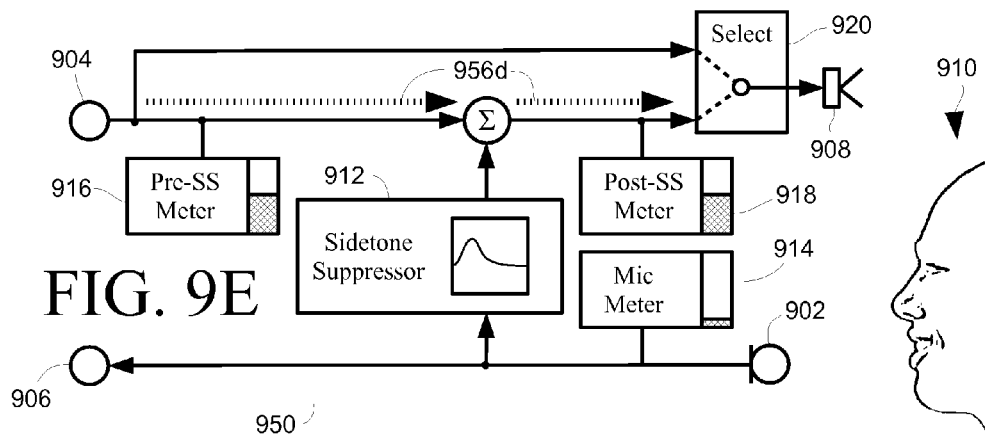
FIG. 9E illustrates the condition of the system of FIG. 9A after suppressor adaption under the condition of far-side singletalk.

It may be recognized that a telephonic system should not be expected to generate a sidetone in the absence a local audio. Therefore, referring out to FIG. 9E, microphone reader 914 reads low the system takes no action with regard to switch 920, even though there may be some activity measured at meters 916 and 918 due to distant sound 956$d$ (in this case meters 916 and 918 will be about equal). It is also to be recognized, however, that ambient noises in the vicinity of microphone 902 may create a noise floor and, is sufficient sound is available in the environment, the system may continue to identify sidetone transition events even though a local participant 910 is not speaking. Nevertheless, it may be desirable to set a threshold to be applied to meter 914 under which no sidetone transition events will be recognized This threshold may be set at a level that is below a normal speaking volume but above that of the range of noise floors expected in operation.

Also in the exemplary system, adaption of suppressor 912 is limited to those times when the echo return loss (ERL) is above a certain threshold, which is −18 dB in one exemplary device. In the example of FIG. 9B, this can be seen by taking the ratio of pre-suppressor meter 916 over the value of microphone meter 914. In this way, adaption of suppressor 912 can be avoided at times when only a weak signal is available.

Now although functions and methods implemented certain exemplary embodiments have been described above, one of ordinary skill in the art will recognize that these functions and methods may be generalized to like devices and are adaptable to other audio products, including but not limited to conferencing devices, hands-free devices, playback devices, and recording devices. Likewise, although the described functions have been described through the use of block diagrams and in hardware, one of ordinary skill in the art will recognize that most of the functions described herein may be implemented in software as well. Additionally, the exact configurations described herein need not be adhered to, but rather the diagrams and architectures described herein may be varied according to the skill of one of ordinary skill in the art. Furthermore, the echo cancellation filters described here utilize a finite impulse response filter, however other filters might be used, for example infinite impulse response filters.

What is claimed:

1. A telephonic system for communicating with a distant party implementing an intermittent sidetone component compensator, comprising:
   a telephone component, said telephone component comprising a set connector configured for a personal set, said telephone component further comprising a telephone line connector configured to establish an audio connection with a distant party through a telephone switching network, said telephone component further comprising an intermittent sidetone generator; and
   a portable conferencing device implementing an intermittent sidetone component compensator, said device comprising:
   a full-duplex port including an outgoing port and an incoming port, said full-duplex port connected to said set connector of said telephone component, said outgoing port providing a connection whereby local audio is transmitted to a distant participant through said telephone component; said incoming port providing a connection whereby distant audio is received through said telephone component and the intermittent sidetone component;
   a microphone operable to pick up local audio;
   a speaker configured to produce sound in the local vicinity of said device;
   a sidetone suppressor receiving a signal representing the signal transmitted through said outgoing port or a signal received at said microphone, said compensator adapted to apply a sidetone suppression signal to a signal received through said incoming port and finally produced at said speaker, said compensator further including a pre-suppression meter indicating the audio level of a signal before the sidetone suppression signal is applied, said compensator further including a post-suppression meter indicating the audio level of a signal to which the sidetone suppression signal is applied, said sidetone suppressor further including variables controlling the application of sidetone suppression and a controller for adapting said variables; and
   a null-sidetone detector detecting the absence of a sidetone generated by said intermittent sidetone generator of said telephone component;
   wherein said sidetone component compensator ceases to apply sidetone compensation on the detection of a null-sidetone.

2. A telephonic system according to claim 1, wherein said controller ceases to adapt said variables on the detection of a null-sidetone.

3. A telephonic system according to claim 1, wherein said sidetone suppressor comprises cancellation coefficients, and further wherein said suppressor is operable to convolve said cancellation coefficients to achieve a sidetone profile, and further wherein said compensator applies the profile to the signal received at the incoming port.

4. A telephonic system according to claim 1, wherein said null-sidetone detector utilizes information from said pre-suppression and post-suppression meters, and further wherein a null-sidetone is not detected where said post-suppression meter reads less than or equal to the pre-EC meter.

5. A telephonic system according to claim 4, wherein the comparison between said pre-suppression meter against said post-suppression meter includes a threshold or hysteresis whereby a marginal excess of amplitude at said post-suppression meter over that read at the pre-suppression meter does not trigger a null-sidetone detection.

6. A telephonic system according to claim 1, wherein on detection of a null-sidetone a disengagement step is performed selected from the group consisting of resetting coefficients, increasing the rate of adaption of those coefficients, bypassing the sidetone suppressor and holding the value of coefficients.

7. A telephonic system according to claim 1, wherein said set connector is adapted to connect to a device selected from the group consisting of headsets and handsets.

8. A telephonic system according to claim 1, wherein said outgoing and said incoming ports are both selected from the group consisting of physical connectors, terminals, contacts, network, wireless and virtual connectors.

9. A conferencing pod for communicating with a distant party through a telephonic device having a set connector for a set device and an intermittent sidetone generator, comprising:
- an intermittent sidetone component compensator;
- an outgoing port and an incoming port configured to connect to the set connector of the telephonic device, said outgoing port providing a connection whereby local audio is transmittable to a distant participant through a connected telephonic device; said incoming port providing a connection whereby distant audio is receivable through a connected telephonic device;
- a microphone operable to pick up local audio;
- a speaker configured to produce sound in the local vicinity of said pod;
- a sidetone suppressor receiving a signal representing the signal transmitted through said outgoing port or received by said microphone, said compensator adapted to apply a sidetone cancellation signal to a signal received through said incoming port and finally produced at said speaker, said compensator further including a pre-suppression meter indicating the audio level of a signal before the sidetone suppression signal is applied, said compensator further including a post-suppression meter indicating the audio level of a signal to which the sidetone cancellation signal is applied, said sidetone suppressor further including variables controlling the application of sidetone compensation and a controller for adapting said variables; and
- a null-sidetone detector adapted to detect the absence of a sidetone generated by the intermittent sidetone generator of said telephone device;
- wherein said intermittent sidetone compensator ceases to apply sidetone suppression on the detection of a null-sidetone.

10. A conferencing pod according to claim 9, wherein said pod does not adapt said variables on the detection of a null-sidetone.

11. A conferencing pod according to claim 9, wherein said variables comprise cancellation coefficients, and further wherein said pod is operable to convolve said cancellation coefficients to achieve a sidetone profile, and further wherein said compensator applies the profile to the signal received at the incoming port.

12. A conferencing pod according to claim 9, wherein on detection of a null-sidetone a disengagement step is performed selected from the group consisting of resetting coefficients, increasing the rate of adaption of those coefficients, bypassing the sidetone suppressor and holding the value of coefficients.

13. A system according to claim 9, wherein said set connector is adapted to connect to a device selected from the group consisting of headsets and handsets.

14. A conferencing pod for communicating with a distant party through a telephonic device having a set connector for a set device and an intermittent sidetone generator, said pod adapted to apply remedial measures for sidetone intermittency, said pod comprising:
- an intermittent sidetone component compensator;
- an outgoing port and an incoming port configured to connect to the set connector of the telephonic device, said outgoing port providing a connection whereby local audio is transmitted to a distant participant through a connected telephonic device; said incoming port providing a connection whereby distant audio is received through a connected telephonic device;
- a microphone operable to pick up local audio;
- a speaker configured to produce sound in the local vicinity of said pod;
- a sidetone suppressor receiving a signal representing the signal transmitted through said outgoing port, said compensator applying a sidetone suppression signal to a signal received through said incoming port and finally produced at said speaker, said sidetone suppressor further including variables controlling the application of sidetone suppression and a controller for adapting said variables, those variables including cancellation coefficients, wherein said controller is operable to convolve said coefficients with the signal transmitted through said outgoing port to generate a sidetone cancellation signal;
- a coefficients converger operable to converge said coefficients to a solution corresponding to the sidetone generated by the telephonic device, further wherein said converger halts adaption of said coefficients at times when far-side singletalk or doubletalk is detected;
- a sidetone transition detector configured to compare the volume levels before and after application of said suppressor and make a determination of whether said suppressor is generating echo, said detector further configured to perform a disengagement step on condition that echo is determined to be produced;
- a null-sidetone detector adapted to detect the absence of a sidetone generated by the intermittent sidetone generator of said telephone device;
- wherein said intermittent sidetone compensator ceases to apply sidetone suppression on the detection of a null-sidetone.

15. A conferencing pod according to claim 14, wherein the disengagement step is to disengage said suppressor.

16. A conferencing pod according to claim 14, wherein the disengagement step is to halt the convergence of said coefficients.

17. A conferencing pod according to claim 14, wherein said detector is further configured to perform an engagement step on condition of detection of the presence of a sidetone.

18. A conferencing pod according to claim 17, wherein the engagement step increases the rate of adaption of said coefficients for a period of time.

* * * * *

UNITED STATES PATENT AND TRADEMARK OFFICE
CERTIFICATE OF CORRECTION

| | | |
|---|---|---|
| PATENT NO. | : 8,050,398 B1 | |
| APPLICATION NO. | : 11/933388 | |
| DATED | : November 1, 2011 | |
| INVENTOR(S) | : Xin Xu | |

It is certified that error appears in the above-identified patent and that said Letters Patent is hereby corrected as shown below:

In column 15, line 40, delete "recognized" and insert -- recognized. --, therefor.

Signed and Sealed this
Thirty-first Day of January, 2012

David J. Kappos
*Director of the United States Patent and Trademark Office*